Jan. 24, 1956 H. C. FRENTZEL 2,731,986

WIRE WEAVING LOOMS

Filed Dec. 6, 1950 13 Sheets-Sheet 1

INVENTOR
HERMAN C. FRENTZEL
BY Christopher L. Wood
ATTORNEY

Jan. 24, 1956 H. C. FRENTZEL 2,731,986

WIRE WEAVING LOOMS

Filed Dec. 6, 1950 13 Sheets-Sheet 2

INVENTOR
HERMAN C. FRENTZEL
BY Christopher L. Wael
ATTORNEY

INVENTOR
HERMAN C. FRENTZEL
BY Christopher L. Waal
ATTORNEY

WIRE WEAVING LOOMS

Filed Dec. 6, 1950 13 Sheets-Sheet 4

INVENTOR
HERMAN C. FRENTZEL
BY Christopher L. Wood
ATTORNEY

INVENTOR
HERMAN C. FRENTZEL
BY Christopher L. Waal
ATTORNEY

Jan. 24, 1956 H. C. FRENTZEL 2,731,986

WIRE WEAVING LOOMS

Filed Dec. 6, 1950 13 Sheets-Sheet 6

INVENTOR
HERMAN C. FRENTZEL
BY Christopher L. Waal
ATTORNEY

INVENTOR
HERMAN C. FRENTZEL
BY Christopher L. Waal
ATTORNEY

WIRE WEAVING LOOMS

Filed Dec. 6, 1950 13 Sheets-Sheet 8

INVENTOR
HERMAN C. FRENTZEL
BY Christopher L. Waal
ATTORNEY

INVENTOR
HERMAN C. FRENTZEL
BY Christopher L. Waal
ATTORNEY

Jan. 24, 1956 H. C. FRENTZEL 2,731,986

WIRE WEAVING LOOMS

Filed Dec. 6, 1950 13 Sheets-Sheet 10

INVENTOR
HERMAN C. FRENTZEL
BY Christopher L. Waal
ATTORNEY

INVENTOR
HERMAN C. FRENTZEL
BY Christopher L. Wael
ATTORNEY

INVENTOR
HERMAN C. FRENTZEL
BY Christopher L. Waal
ATTORNEY

WIRE WEAVING LOOMS

Filed Dec. 6, 1950 13 Sheets-Sheet 13

INVENTOR
HERMAN C. FRENTZEL
BY Christopher L. Waal
ATTORNEY 2,731,986

WIRE WEAVING LOOMS

Herman C. Frentzel, Milwaukee, Wis., assignor to Appleton Wire Works, Inc., Appleton, Wis., a corporation of Wisconsin Application December 6, 1950, Serial No. 199,482

30 Claims. (Cl. 139—126)

The present invention relates to looms and more particularly to weft-manipulating means for looms.

An object of the invention is to provide a loom having improved weft-manipulating means of the pirnless shuttle type, and further to provide weft-manipulating means of this type which can readily be applied to existing looms.

Another object is to provide a loom having at a shuttle box thereof a control wheel or roller cooperable with the shuttle to serve various functions, such as weft stretch-off, shuttle-positioning after stretch-off, shuttle-braking, weft-indicating, and lay control.

Still another object is to provide a loom including a novel gripper shuttle which is propelled through the shed in both directions to lay weft therein from supply means at opposite sides of the loom, and which cooperates with other parts of the loom in such manner as to conserve weft material.

A further object is to provide a loom having an improved picking or shuttle-throwing mechanism which is of simple and reliable construction and capable of rapid operation, the mechanism being further adapted to form a unit with a shiftably mounted shuttle box.

A still further object is to provide a loom including a novel form of shuttle box which is readily adjustable to permit weaving of fabrics of different widths without changing the length of the lay or the reed.

The invention further consists in the several features hereinafter described and claimed.

In the accompanying drawings.

Figure 1:
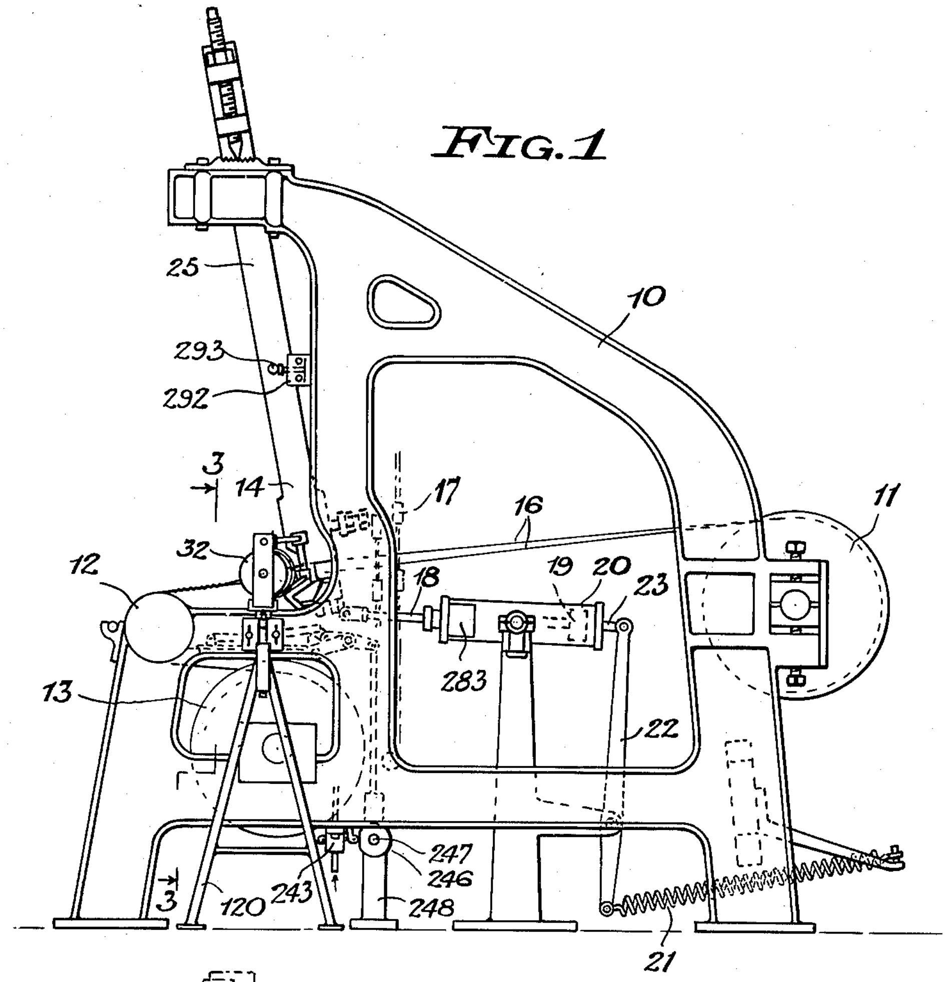
Fig. 1 is an elevation showing the right-hand side of a wire weaving loom embodying the invention.
Figure 2:
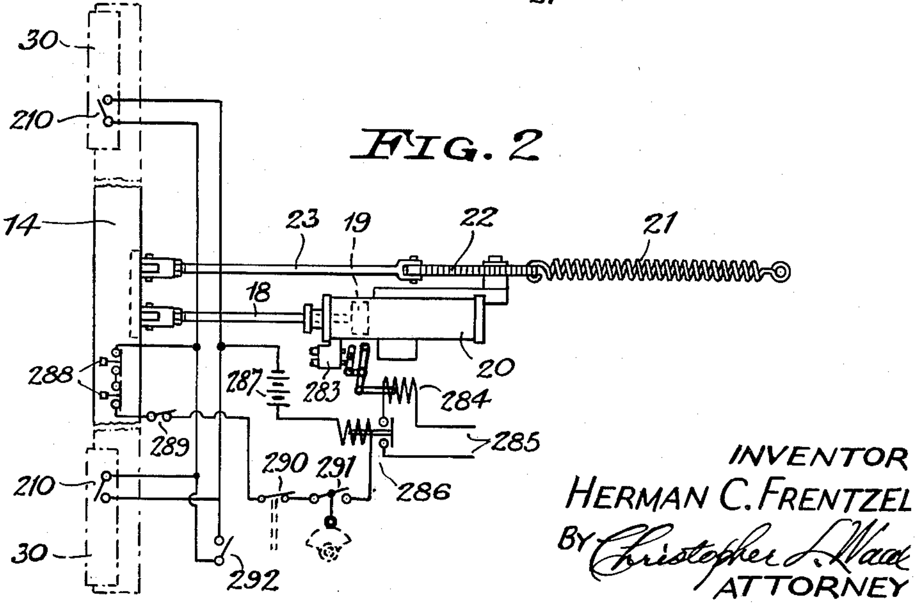
Fig. 2 is a diagrammatic top view of lay-operating means of the loom and showing schematically a lay-controlling circuit.

In the drawings, the invention is shown to be embodied in a wire weaving loom which by way of example may be of the general type disclosed in Patent 1,790,335 to Weissenborn for Power Loom, issued January 27, 1931. The loom includes spaced side frame members 10 between which are mounted a warp beam 11, a breast beam 12, and a cloth-receiving roll 13, all as usual. A swinging lay 14, here shown to be of the suspended type, is operated as hereinafter described to beat up weft wires **15*a* and 15*b* laid in the shed which is formed between the warp wires 16 by the alternate reciprocation of the heddles 17**.

The lay 14 is retracted to its dwell by a pivotally connected piston rod 18 secured to a piston 19 working in an air cylinder 20, and is urged on its forward stroke by a coiled tension spring 21 connected at one end to the loom frame and at its other end to a lever 22 operatively connected to the lay by a link 23. The admission of air to the cylinder 20 is both automatically and manually controlled as hereinafter described.

The lay 14 includes the usual horizontally extending lay beam 24 secured to the lower ends of side arms 25, and further includes the usual lay cap 26 between which and the lay beam is detachably secured the usual reed 27. The reed comprises parallel steel strips or dents 28 forming between them narrow spaces receiving therethrough the warp wires, the forward edges of the strips being disposed in a plane to form the face of the reed for beating up the weft wires.

The weft-manipulating means of the present invention includes a fly shuttle 29 of the pirnless or gripper type which is thrown through the shed between shuttle boxes 30 adjustably mounted at the opposite end portions of the lay beam, the latter being provided with extension members 31. The reciprocatory gripper shuttle carries the weft wire through the shed in each direction from weft-supplying units designated generally by the numeral 32 and located at each side of the loom. The weft wires **15*a* and 15*b***, which are preferably, although not necessarily, identical, are fed from the right-hand and left-hand weft-supplying units.

The gripper shuttle 29, shown in detail in Figs. 34 to 44, comprises an elongated boat-shaped body 33 of non-magnetic material, preferably metal, such as aluminum or stainless steel, the shuttle body being flat-bottomed and adapted to slide over the warp wires forming the bottom of the shed. In the loom illustrated, the bottom warp wires of the shed will adequately support the shuttle without the use of the conventional shuttle board or race member. The shuttle is suitably guided in a smooth true course along the reed, as by means of a channel-shaped permanent magnet 34 which is secured in the reed side of the shuttle body and exerts an attractive force on the magnetizable reed, there being a small air gap between the reed and the magnet. The permanent magnet is disposed in a longitudinal groove 35 formed in the shuttle body and has its ends clamped by cross bolts 36. The shuttle body is also provided near its opposite ends with reed rollers 37 which are housed in wells 38 formed in the shuttle body and project slightly from the reed side of the shuttle body to ride on the reed face and determine the small air gap between the polar portions of the magnet and the edges of the magnetizable reed dents. Each reed roller has a ball-bearing 39 carried on a headed pin 40 and has a resilient annular tread member 41, such as of rubber, which is attached to the outer race of the bearing by opposed shouldered clamping rings 42 riveted together. A spacing washer 43 is interposed between the inner bearing race and the lower wall of the roller well.

The top wall of the shuttle body has formed therein a longitudinally extending recess or cavity 44 which terminates in notches 45 in the opposite ends of the shuttle body, the recess having a widened and deepened intermediate portion 46 and having aligned central end grooves 47. An elongated gripping bar 48 extends centrally in the recess 44 and has a thickened intermediate portion 49 which is clamped to the bottom of the intermediate portion 46 of the recess by screws 50. The opposite end portions 51 of the bar extend in the grooves 47 and are provided with terminal jaws 52 having lateral weft-gripping serrations or teeth 53, the teeth being formed on one side of one of the terminal jaws and on the other side of the other terminal jaw. Gripping bars 54 are disposed along opposite sides of the central gripping bar 48 at the opposite end portions of the latter bar and have widened inner end portions 55 which are clamped to the sides of the central bar by screws 56, the shuttle body being apertured to accommodate these screws. The reduced outwardly projecting end portions 57 of the two side bars 54 are laterally resilient and have terminal jaws 58 provided with serrations 59 cooperating with the respective serrations 53 at the opposite ends of the central bar to grip the end of a weft wire at either end of the shuttle. The gripping planes of the opposite serrated end portions of the central gripping bar are not aligned, but are laterally offset a small distance, for example, in the order of ⅛", to facilitate feeding and release of the weft wires **15*a* and 15*b*, as hereinafter described. A pair of narrow channels 60 extend longitudinally in the top face of the shuttle along the opposite sides of the central gripping bar 48 to admit shiftable feeding and releasing parts, hereinafter described, for the respective weft wires 15*a* and 15*b*. Each channel 60 has an open leading end at an end notch 45 of the shuttle body, and has a trailing portion which is formed between the central gripping bar and an adjacent side bar 54 and extends to the relatively separable serrated end jaws 52 and 58** of these bars.

Figures 16, 17, 18:
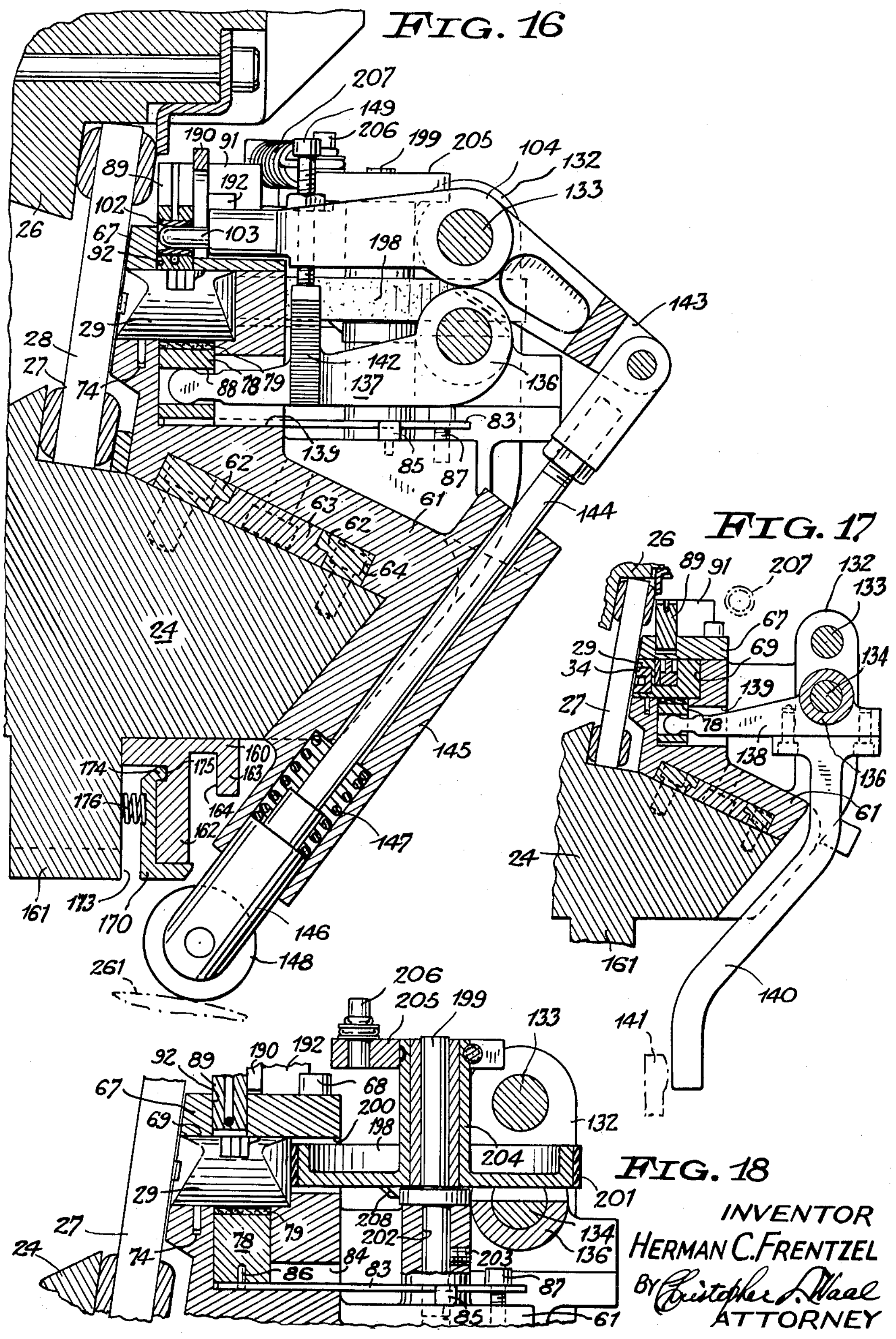
Fig. 16 is a transverse elevational section taken generally on the line 16—16 of Fig. 10.
Fig. 17 is a transverse elevational section taken generally on the line 17—17 of Fig. 10.
Fig. 18 is a transverse elevational section taken generally on the line 18—18 of Fig. 10.
Figure 20:
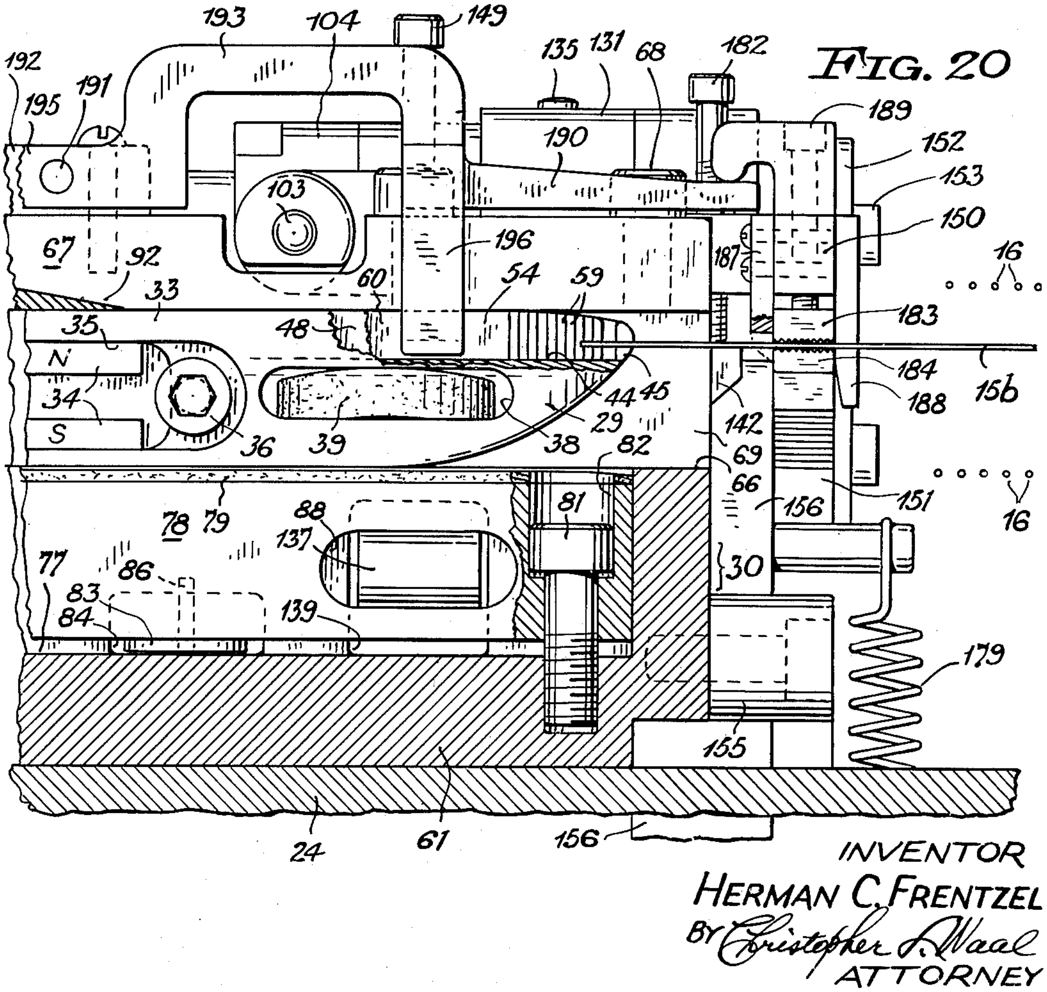
Fig. 20 is a sectional elevation taken generally on the line 20—20 of Fig. 15, the lay being on its forward stroke.
Figures 21, 22, 23, 24, 25, 26, 27:
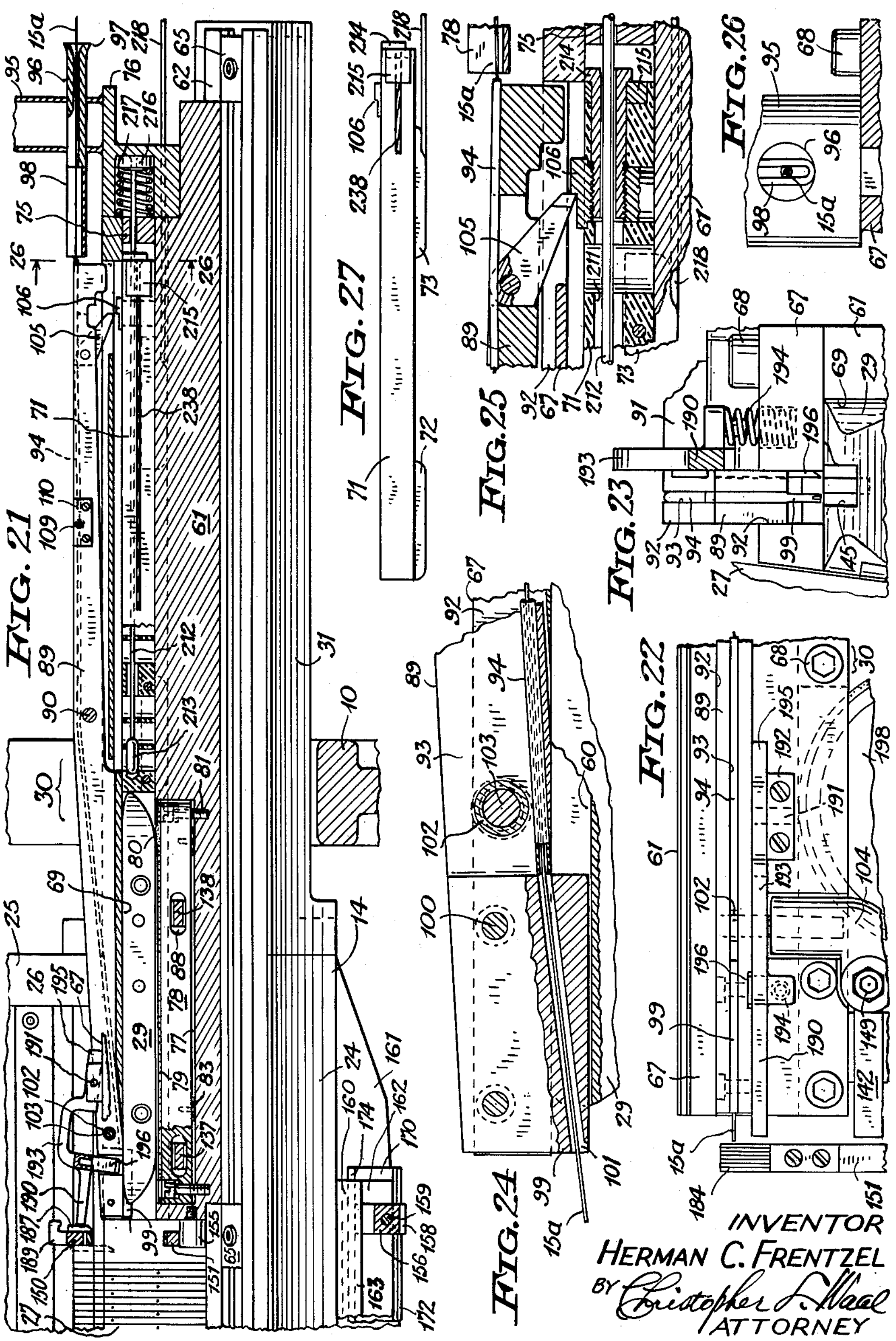
Fig. 21 is a longitudinal elevational section of the right-hand shuttle box unit, taken generally on the line 21—21 of Fig. 10, the shuttle being boxed.
Fig. 22 is a fragmentary top view of the inner end portion of the right-hand shuttle box.
Fig. 23 is an elevation of a portion of the inner end of the right-hand shuttle box, parts being shown in section.
Fig. 24 is an enlarged detail elevational section of the discharge end of a weft feeder, showing a feeding feather of the device inserted into the shuttle.
Fig. 25 is a longitudinal elevational section of the outer end portion of the shuttle box.
Fig. 26 is an enlarged fragmentary sectional view of the discharge portion of a weft feeding guide, taken generally on the line 26—26 of Fig. 21.
Fig. 27 is a detail side view of a shuttle-throwing block.
Figure 28:
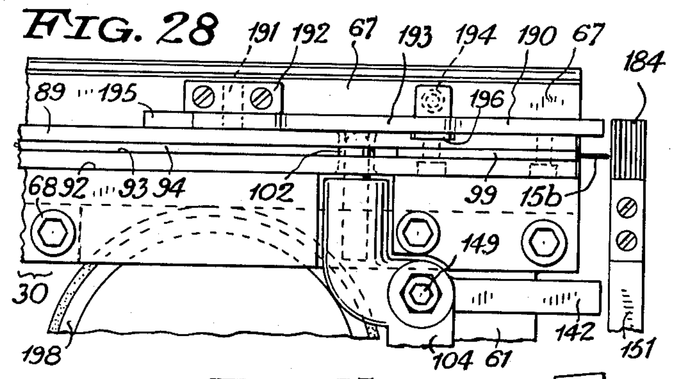
Fig. 28 is a fragmentary top view of the inner end portion of the left-hand shuttle box.

The opposed shuttle boxes 30 at the right-hand and left-hand ends of the lay are of generally similar construction and a description of one will serve for both. Each shuttle box comprises an elongated base or body 61 of light-weight cast metal, such as aluminum alloy. The shuttle box is longitudinally adjustable along the top of the lay beam 24 and its extension member and is suitably guided as by a pair of laterally spaced gibs 62 which are rigidly secured to the lay beam and engaged by an intervening flanged bar 63 secured to the bottom of the shuttle box, the latter having a longitudinal groove 64 to accommodate the gibs and the bar. The shuttle box is held in longitudinally adjusted position, as by stop blocks 65, Figs. 19 and 21, adjustably clamped to the lay beam. At its upper rear portion the shuttle box base has a longitudinal rabbet 66 the upper side of which is closed by an elongated metal plate 67 secured to the base as by screws 68, thus forming a channel 69 all or a part of which is closed along the rear by the face of the reed, the channel being open at the inner end of the base. The inner end portion of the channel is adapted to receive and guide the shuttle, as seen in Figs. 16, 20, and 21, the channel being slightly higher and wider than the shuttle. When the shuttle is housed in the shuttle box the rear side of the shuttle is confined by the face of the reed, and in some cases by a magnetizable plate 70, Fig. 10, which is carried by the lay and forms an extension of the reed face. With this arrangement the shuttle box may be adjusted along the lay beam so as to permit weaving of fabrics of different widths, it being unnecessary to change the length of the reed.

An elongated reciprocatory thrower block or picker block 71 is longitudinally slidable in the shuttle box channel 69 to throw the shuttle through the shed, as hereinafter described. The thrower block, hereinafter more fully described, is suitably guided in its travel, as by blades 72 and 73 rigidly secured to the bottom of the thrower block and slidable in a guide groove 74 formed in the bottom wall of the rabbet 66. The outer end portion of the shuttle box has secured thereto a pair of adjacent blocks 75 and 76, the former of which closes the outer end of the channel 69. When the thrower block 71 is fully retracted, the distance between the forward end of the block and the inner or open end of the channel 69 is slightly longer than the shuttle, as seen in Fig. 21.

Opening at the bottom face of the shuttle-receiving portion of the rabbet 66 is an elongated cavity 77 which houses therein a vertically movable shuttle brake member 78 having a top friction lining 79 engageable with the bottom face of the shuttle, the end of the lining remote from the entrance of the channel 69 having a sloping stop portion 80, Fig. 21. The brake member is vertically guided at opposite ends by headed vertical screws 81 which are adjustably threaded into the shuttle box base and extend in shouldered bores 82 formed in the shuttle brake, thus adjustably limiting the upward displacement of the brake member. The brake member is normally urged upwardly to its limit position by a pair of horizontal leaf springs 83 which extend through lateral openings 84 in the shuttle box base and are intermediately fulcrumed on blocks 85, the inner ends of the springs engaging the bottom of the brake member at positioning pins 86, and the outer ends of the springs being urged downwardly by tensioning screws 87 threaded into the shuttle box base, Fig. 18. The brake member is provided with transverse openings 88 receiving brake-releasing parts hereinafter described.

Disposed longitudinally above the top plate 67 of the shuttle box is a generally horizontal elongated weft-feeding lever or feeder arm 89 which is pivoted at its middle portion on a horizontal pivot pin 90 mounted in a bracket 91 secured to the top plate, the arm being rockable in a vertical plane through a small angle, and being movable in a longitudinal guide slot 92 in the top plate. The feeder arm has a narrow longitudinally extending vertical slot 93 in which is secured a small diameter metal tube 94 terminating near the opposite ends of the arm. The weft wire slidably passes through this tube and is gripped by the shuttle and carried through the shed, as hereinafter described. A lightweight tubular pillar 95 is rigidly attached to the block 76 at the outer end of the shuttle box and mounts a transversely extending horizontal weft wire guide 96, Figs. 10, 11, and 21, in alignment with the outer end of the wire-guiding tube 94 in the feeder arm, the outer end 97 of the guide being funnel-shaped and the inner end being in the form of a channel 98 registering with the adjacent end of the wire-guiding tube. The weft wire is conducted to the guide 96 from the associated weft-supplying unit 32.

The forward or inner end portion of the feeder arm 89 extends approximately to the inner end of the shuttle box and carries a thin feeding vane or feather 99 which projects longitudinally below the feeder arm in a vertical plane, the thicker upper portion of the vane being rigidly secured in the vertical slot 93 of the arm, as by screws 100. The forward end of the weft-guiding tube 94 in the feeder arm communicates with a narrow forwardly and downwardly inclined passage 101 formed longitudinally in the vane, the end of the weft wire extending through this passage, as seen in Fig. 24, which shows the vane in its depressed position in the shuttle at the moment the shuttle is about to be thrown from the shuttle box. The feeder vane of the right-hand feeder arm is insertible into that one of the two shuttle channels 60 which is nearer the reed face, while the vane of the left-hand feeder arm is insertible into the other shuttle channel. During the initial part of the shuttle flight in either direction, the vane opens the serrated jaws 52, 58 at the trailing end of the corresponding shuttle channel 60, and the end of the weft wire protruding from the vane is caught or pinched in these jaws as they leave the vane, carrying the weft wire through the shed to the opposite shuttle box.

At a point near the feeding vane, each feeder arm has a transverse bushing 102 loosely receiving therein a pin 103 secured to an end of an actuating lever 104, hereinafter described, by which the feeder arm is rocked. At a point near its opposite end each feeder arm carries a pivoted latch or pawl 105 which is releasably engageable with the upper end of a shoulder plug 106 secured to the rear end of the thrower block 71. The thrower block, which is actuated as hereinafter described, is retained in retracted position by this pawl, as seen in Fig. 25 when the feeding vane 99 is in its upper position. When the feeding vane is lowered into the boxed shuttle, as seen in Figs. 21 and 24, the pawl is released from the thrower block which is then projected on its shuttle-throwing stroke. In Fig. 21, the thrower block is shown at the instant of its release, ready to move on its forward stroke.

Figure 30:
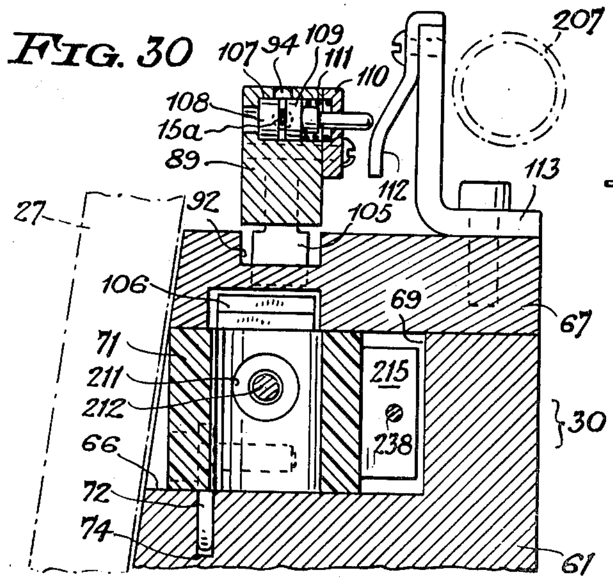
Fig. 30 is a detail transverse sectional view of the right-hand shuttle box, taken generally on the line 30—30 of Fig. 10.
Figure 31:
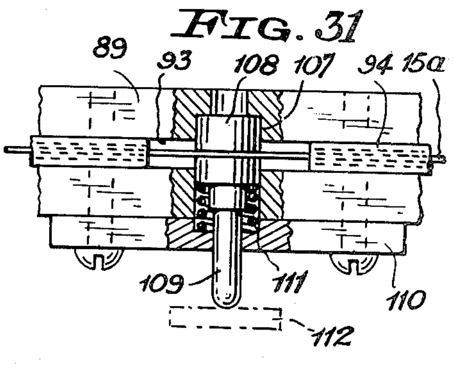
Fig. 31 is a fragmentary top view of a portion of the feeding lever at the region shown in Fig. 30, parts being broken away and parts being shown in section.
Figure 34:
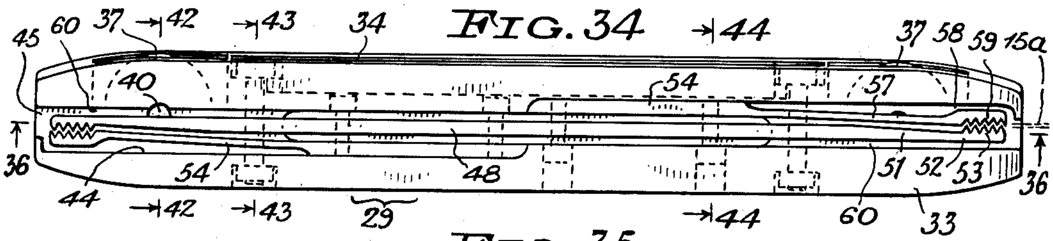
Fig. 34 is a top view of a two-way gripper shuttle.
Figure 35:
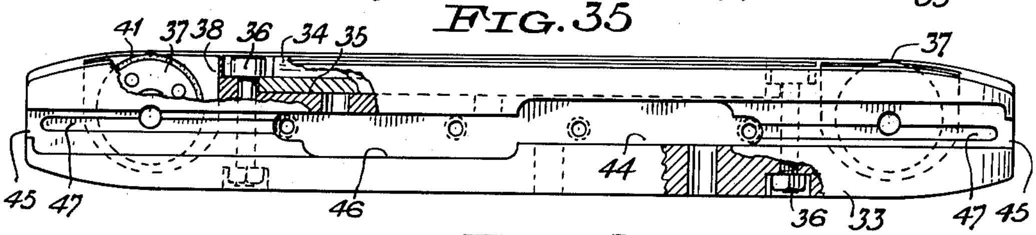
Fig. 35 is a top view of the shuttle with weft-gripping members thereof removed, parts being broken away and parts being shown in section.
Figure 36:
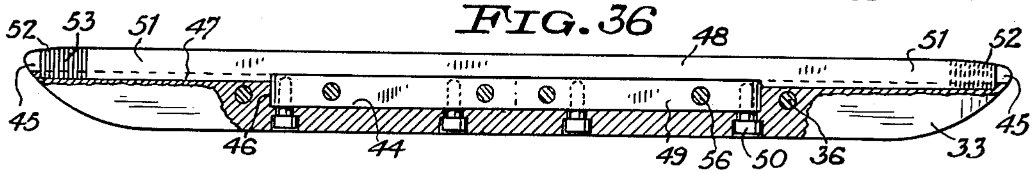
Fig. 36 is a longitudinal elevational section of the shuttle, taken generally on the line 36—36 of Fig. 34.
Figure 37:
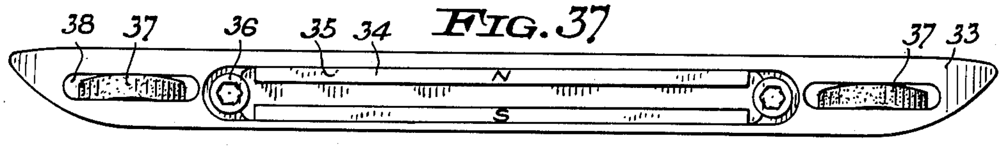
Fig. 37 is an elevation of the reed side of the shuttle.
Figure 38:
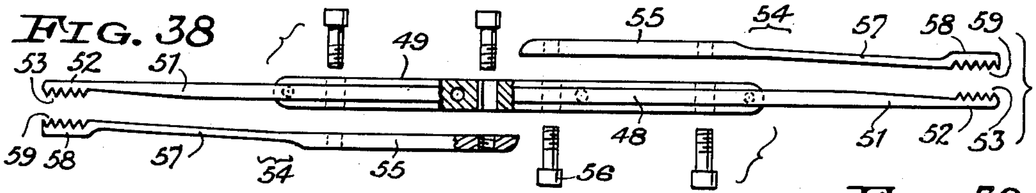
Fig. 38 is an exploded view of the weft-gripping members.
Figure 39:
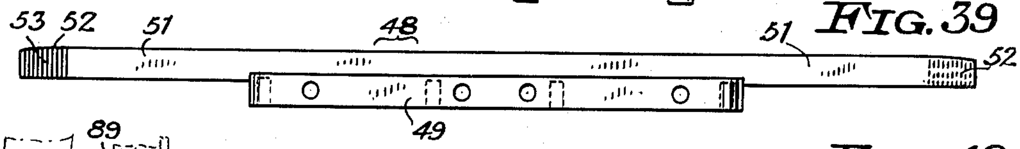
Fig. 39 is a side elevation of the central weft-gripping member.
Figure 40:
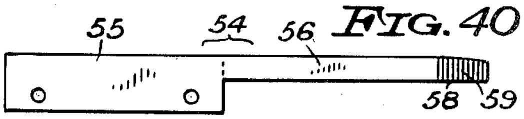
Fig. 40 is a side elevation of one of the outer weft-gripping members.
Figure 41:
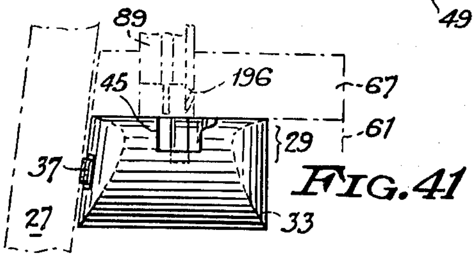
Fig. 41 is an end view of the shuttle, parts of a reed and right-hand shuttle box being shown in broken lines.
Figure 43:
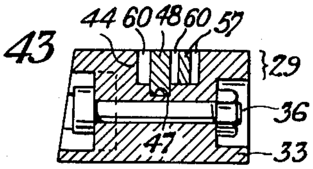
Fig. 43 is a transverse elevational section, taken generally on the line 43—43 of Fig. 34.
Figures 42, 44:
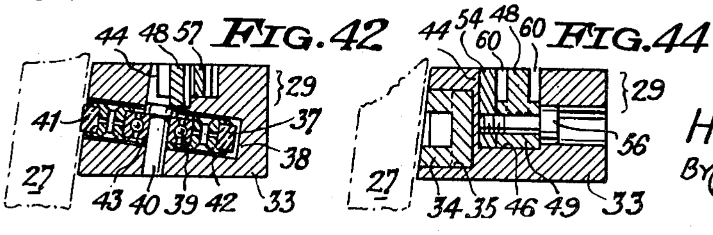
Fig. 42 is a transverse elevational section, taken generally on the line 42—42 of Fig. 34.
Fig. 44 is a transverse elevational section, taken generally on the line 44—44 of Fig. 34.

At a point between the feeder arm pivot 90 and the pawl 105, the feeder arm has a shouldered transverse bore 107, Figs. 30 and 31, in which is seated a weft-clamping button 108 and in which is slidable a headed weft-clamping plunger 109, the weft wire passing between the button and the plunger to be engaged thereby, and the weft-guiding tube 94 having a gap to accommodate the clamping parts. The headed plunger 109 is confined by an apertured plate 110 through which the stem of the plunger slidably passes, and the plunger is urged against the weft wire by a light coiled spring 111 to impose a light friction on the weft wire. A resilient cam blade 112 is carried by a bracket 113 secured to the shuttle box cover plate 67 and is engageable by the plunger 109 when the pawl-carrying end of the feeder arm 89 is in depressed thrower-holding position, thus clamping the weft wire against movement. When the vane-carrying end of the feeder arm is depressed to feed the weft wire into the shuttle, the plunger is elevated to release the cam pressure, and the weft wire is then under a slight friction imposed by the coiled spring 111.

Figures 3, 4, 5:
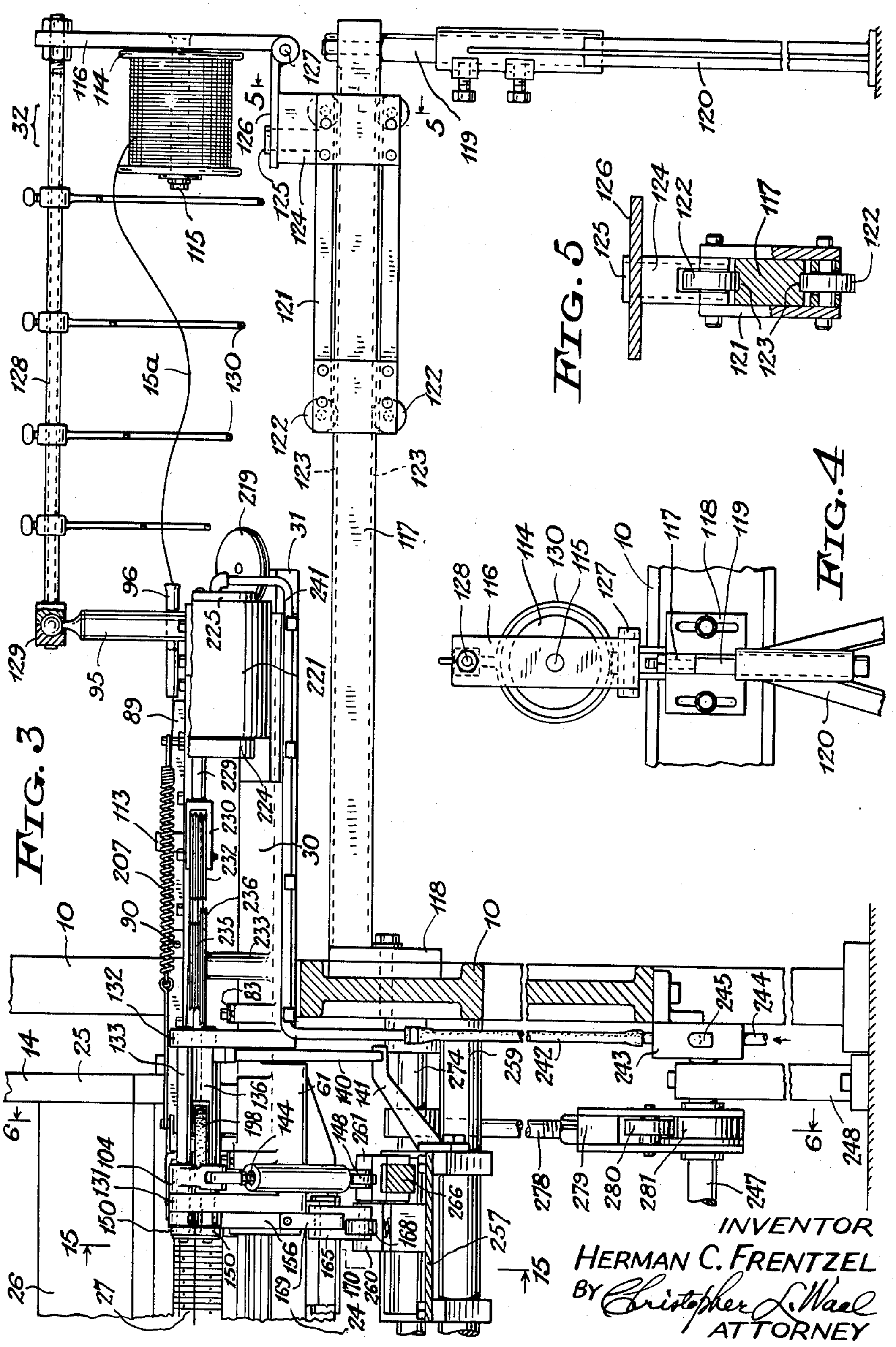
Fig. 3 is an elevational section of the right-hand side portion of the loom, taken generally on the line 3—3 of Fig. 1.
Fig. 4 is a fragmentary detail end view of a weft spool support.
Fig. 5 is a detail sectional view taken generally on the line 5—5 of Fig. 3.

Each weft-supplying unit 32, Figs. 3 to 5, includes a wire spool 114, preferably non-rotatable, which is spaced outwardly from the wire guide 96 and is detachably carried on a horizontal rod 115, secured to a vertical mounting plate 116, the rod extending in a direction generally parallel to the lay and being approximately at the same elevation as the wire guide 96. A stationary horizontal track bar 117 extends outwardly from the side of the loom in parallel relation to the lay and in a vertical plane about midway of the stroke of the lay beam. The track bar is supported at its inner end by a vertical plate 118 adjustably clamped to the side frame member 10 of the loom, and the outer end of the bar is carried on a vertical rod 119 adjustably clamped to a standard or A-frame 120. A carriage 121 is movable along the track bar and has guide rollers 122 riding in top and bottom grooves 123 formed longitudinally in the track bar. A top block 124 on the carriage has a vertical pin 125 on which is swivelled a horizontal plate 126 having a transverse hinge connection 127 with the lower end of the spool mounting plate 116. The upper end of the spool mounting plate is rigidly secured to an end of a generally horizontal tubular connecting bar or strut 128 of light-weight metal, the other end of the bar having a ball-and-socket connection 129 with the upper end of the pillar 95 on the shuttle box. The connecting bar 128 carries thereon a plurality of spaced coaxial guide rings or loops 130 through which the weft wire extends from the spool 114 to the shuttle box wire guide 96, the rings being progressively smaller toward the shuttle box and being coaxial with the spool-supporting rod 115. With the arrangement above described, the weft wire is drawn off the stationary spool to the feeder arm 89 on the shuttle box, and during the swing of the lay the spool support swivels on the carriage 121, which rolls back and forth a short distance on the track bar. When the shuttle box is adjusted inwardly and outwardly along the lay beam, the spool-supporting carriage moves with the shuttle box and rides on the track bar.

Figure 9:
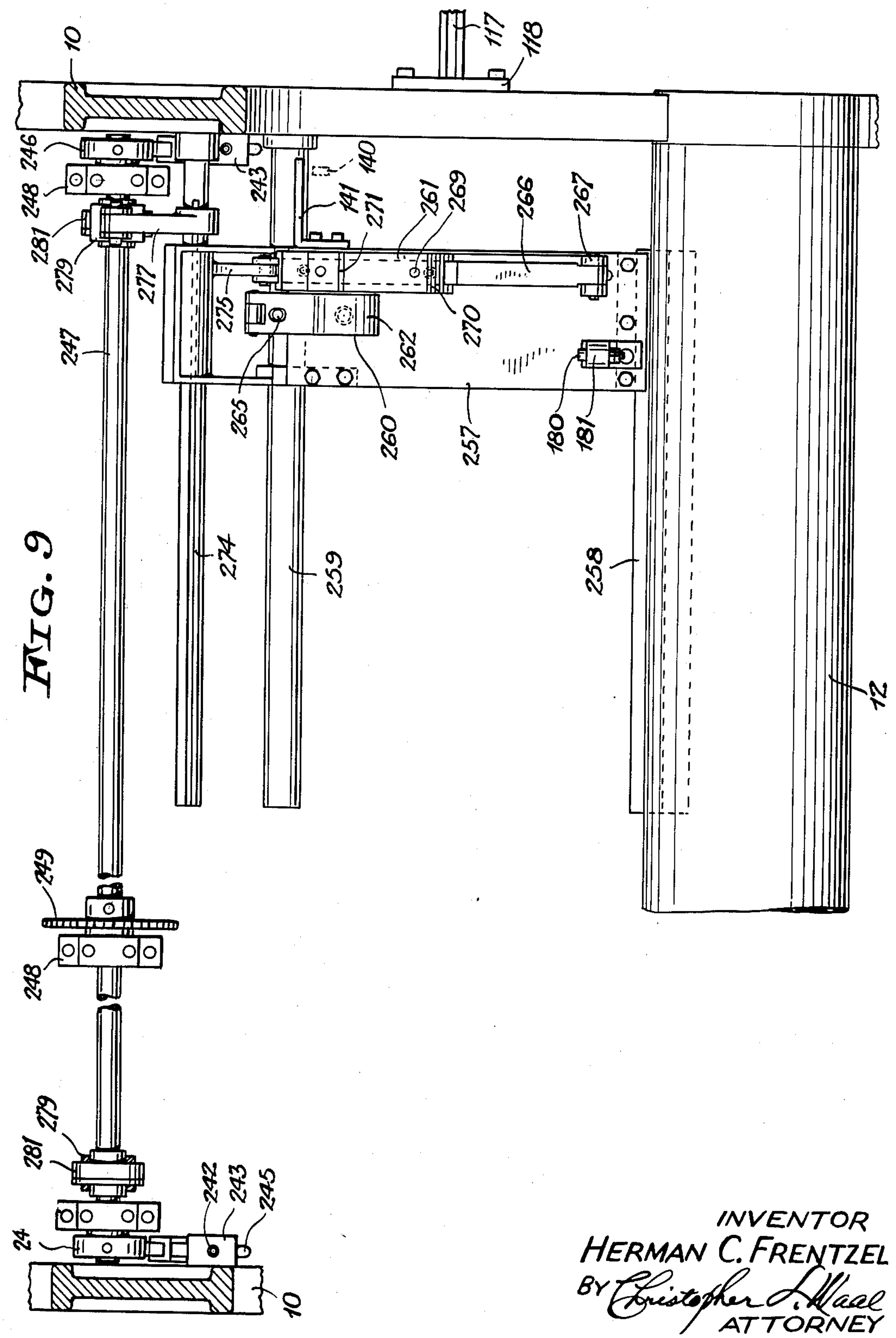
Fig. 9 is a horizontal sectional view taken generally on the line 9—9 of Fig. 6.

At its shuttle-receiving end portion the shuttle box body has spaced forwardly projecting vertical flanges 131 and 132 through which extend horizontal upper and lower shafts or rods 133 and 134 disposed in parallel relation to the lay beam, the shafts being secured to the flange 131 by a vertical locking pin 135. A brake-releasing member 136 has a tubular hub portion rotatably carried on the lower shaft 134 between the flanges 131 and 132 to rock on this shaft, and has rearwardly projecting arms 137 and 138 which extend through openings 139 in the shuttle box body, the arms having rounded ends fitting in the openings 88 of the brake shoe 78 for depressing the shoe to brake-releasing position against the action of the brake-applying springs 83. The brake-releasing member carries a downwardly projecting arm 140, Fig. 17, which is adapted to engage a resilient stationary stop 141, Figs. 3, 6, and 9, at the end of the backward stroke of the lay for releasing the shuttle brake at this point of the cycle of operation. The arm 137 carries an upstanding rib 142, Fig. 19, which is adapted to be depressed by other actuating means, hereinafter described, for holding the brake released at certain other times in the cycle of operation.

The actuating lever 104 for the feeder arm is rockably carried on the upper shaft 133 adjacent to the body flange 131 and has a forked arm 143 pivotally connected to a push rod 144 which extends downwardly through a tubular part 145 formed on the shuttle box body, as seen in Fig. 16. The lower end of the push rod has a head 146 slidably guided in the lower end of the tubular part 145 and normally urged downwardly by a coiled spring 147 within the tubular part. The push rod head 146 carries a roller 148 which is cam-actuated as hereinafter described. The lever 104 also carries an abutment screw 149 engageable with the top edge of the rib 142 of the brake-releasing arm 137 for holding the armed brake-releasing member 136 in brake-releasing position.

Figure 15:
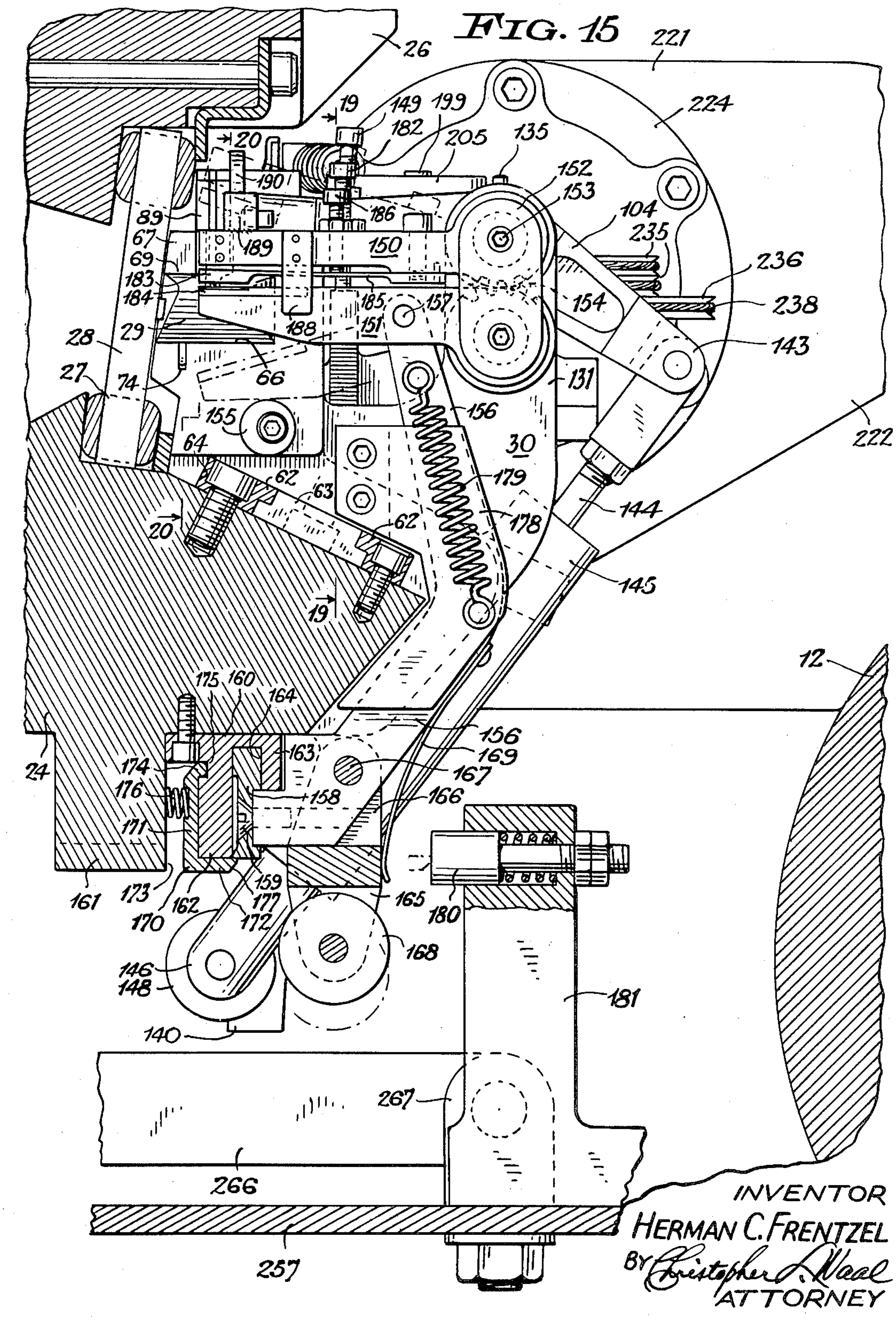
Fig. 15 is a transverse elevational section taken generally on the line 15—15 of Fig. 3, showing the lay on its forward stroke and the shuttle boxed in the right-hand shuttle box unit.
Figures 32, 33:
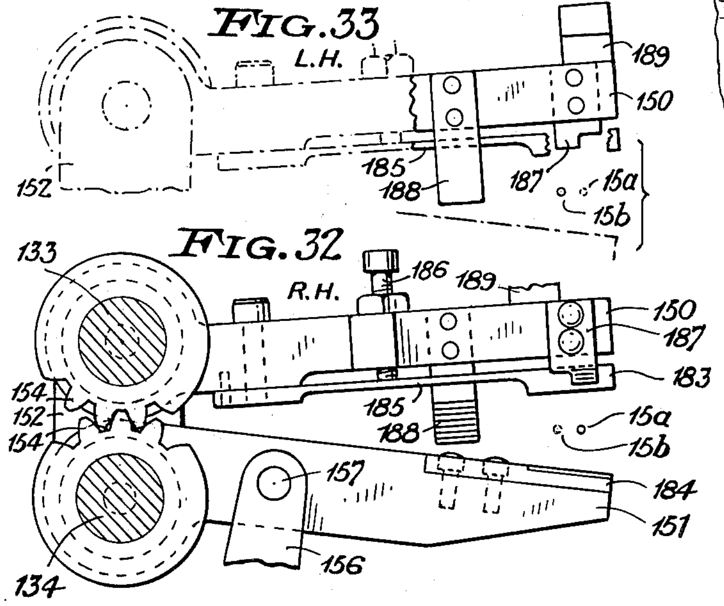
Fig. 32 is a detail sectional view taken generally on the line 32—32 of Fig. 10, showing weft-clamping levers of the right-hand shuttle box in an intermediate position.
Fig. 33 is a detail view of the upper weft-clamping lever of the left-hand shuttle box, parts being broken away.

Upper and lower weft-clamping levers 150 and 151, Figs. 15, 32, and 33, are pivotally carried on the ends of the shafts 133 and 134 and are axially confined thereon by a retaining plate 152 secured to the shafts by screws 153. These levers project rearwardly from the shafts and have their free end portions above and below the path of the weft wires and adjacent to the inner end of the shuttle box. The hub portions of the levers 150 and 151 have meshing gear segments 154 for causing simultaneous movement of the levers with a scissors-like action. The levers are swingable apart to permit passage of the shuttle, and the downward movement of the lever 151 is limited by an adjustable eccentric stop 155 secured to the shuttle box body. An arm 156 has its upper end pivotally connected to the lower lever 151 by a pin 157 and has its lower end secured to a slide block 158 as by a screw 159. A horizontally elongated guide member 160 is secured to the bottom of the lay beam 24 along and in front of a bottom flange 161 of the lay beam. The guide member has spaced downwardly projecting longitudinal flanges 162 and 163 forming between them a downwardly opening slot 164 in which the slide block 158 is vertically slidable. A follower lever 165 has a forked upper end 166 pivotally secured by a pin 167 to the lower end of the arm 156, and carries at its lower end a roller 168 which is cam-actuated as hereinafter described. The follower lever 165 is urged rearwardly against the lower end of the arm 156 by a leaf spring 169 so as to resist relative displacement of these parts during the forward swing of the lay, and the follower lever is swingable about the pin 167 against the yielding action of the spring 169 during the rearward swing of the lay, so as to prevent upward displacement of the arm 156 during this part of the cycle. In Fig. 15, which shows the relation of the parts during the forward swing of the lay, the arm 156 has been displaced upwardly to close the clamping levers and is retained in this position by an elongated latch bar 170 of L-shaped cross-section having a vertical flange 171 and a forwardly projecting horizontal flange 172. The vertical flange 171 is disposed in a slot 173 formed between the downwardly projecting lay beam flange 161 and the downwardly projecting guide member flange 162, and the upper edge of the vertical latch bar flange has a longitudinal bead 174 which fulcrums in a groove 175 formed along the upper portion of the flange 162. One or more coiled springs 176 are interposed between the lay beam flanges 161 and the latch bar flange 171 and urge the latch bar forwardly. The horizontal latch bar flange 172 has a forward edge 177 which retains the latch bar in its upper position, and which is beveled to permit upward displacement of the latch bar. The lever actuating arm 156 is laterally confined between the end face of the shuttle box body and a guide member 178 secured to the body, and the arm is urged downwardly by a coiled spring 179. The latch bar 170 is released at the end of the forward stroke of the lay by striking a resilient stop formed by an axially adjustable spring-pressed plunger 180 carried on a bracket 181.

The upper weft clamping lever 150 carries an abutment screw 182 which in the lower position is engageable with the upper edge of the rib 142 on the brake-releasing member 136 to hold the shuttle brake in released position. The upper and lower weft clamping levers have respective serrated clamping jaws 183 and 184 which are adapted to clamp the weft wire between them. The clamping jaw 183 of the upper lever is carried at the free end of a leaf spring 185 which is adjustably tensioned by a screw 186. The upper weft clamping lever carries a knife 187 adapted to cooperate the lower lever jaw 184 to sever the outgoing weft wire after the weft is laid in the shed. Although the knives at the opposite shuttle boxes are depressed simultaneously, the knives are notched, as seen in Figs. 32 and 33, or otherwise offset, so as to clear the leading ends of the laterally offset weft wires 15*a* and 15*b*. Each upper weft clamping lever 150 carries a downwardly projecting cam tongue 188 laterally engageable with the lower lever to insure good cutting action. Each upper weft-clamping lever also carries a hook member 189 the purpose of which is hereinafter described.

Figure 29:
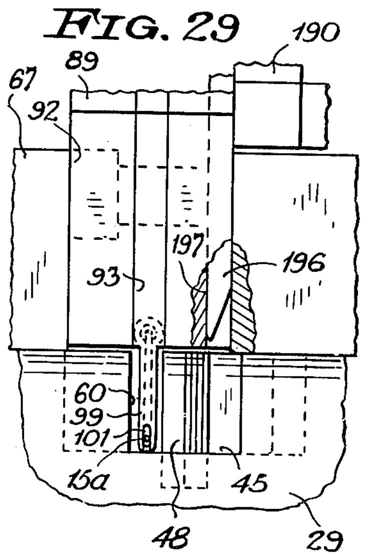
Fig. 29 is an enlarged fragmentary end view of the right-hand shuttle box, showing the weft-feeding feather of the feeding lever in the shuttle, and parts being shown in section.

A weft-releasing lever 190, Figs. 20 to 23, extends along a side of the feeding end portion of the feeder arm 89 and is rockably mounted on a pin 191 secured to a bracket 192 on the shuttle box cover plate 67 to swing in a vertical plane. The weft-releasing lever 190, which is laterally confined between the feeder arm and the bracket 192 and has an arched portion 193 to clear the actuating lever 104 for the feeder arm, is urged upwardly by a compressed coiled spring 194, Fig. 23, pocketed in the feeder arm, the upward travel of the lever being limited, as seen in Fig. 21, by a rear extension 195 engageable with the feeder arm. The weft-releasing lever carries a downwardly projecting cam blade 196, Figs. 20 and 29, which is movable in a side notch 197 formed in the feeder arm and is adapted to enter in the shuttle channel 60 at a point between the fixed gripper bar 48 and the resilient gripper bar 54 so as to spread the gripper jaws 52 and 53 and thus release the gripped end of the weft wire from these jaws after the shuttle is boxed. The free end of the weft-releasing lever 190 extends under the hook member 189 of the weft-clamping lever 150 so that when the latter lever is depressed the weft-releasing lever will be moved downwardly by the hook member, as seen in Fig. 20, to spread the weft-gripping jaws of the shuttle.

Figures 10, 11:
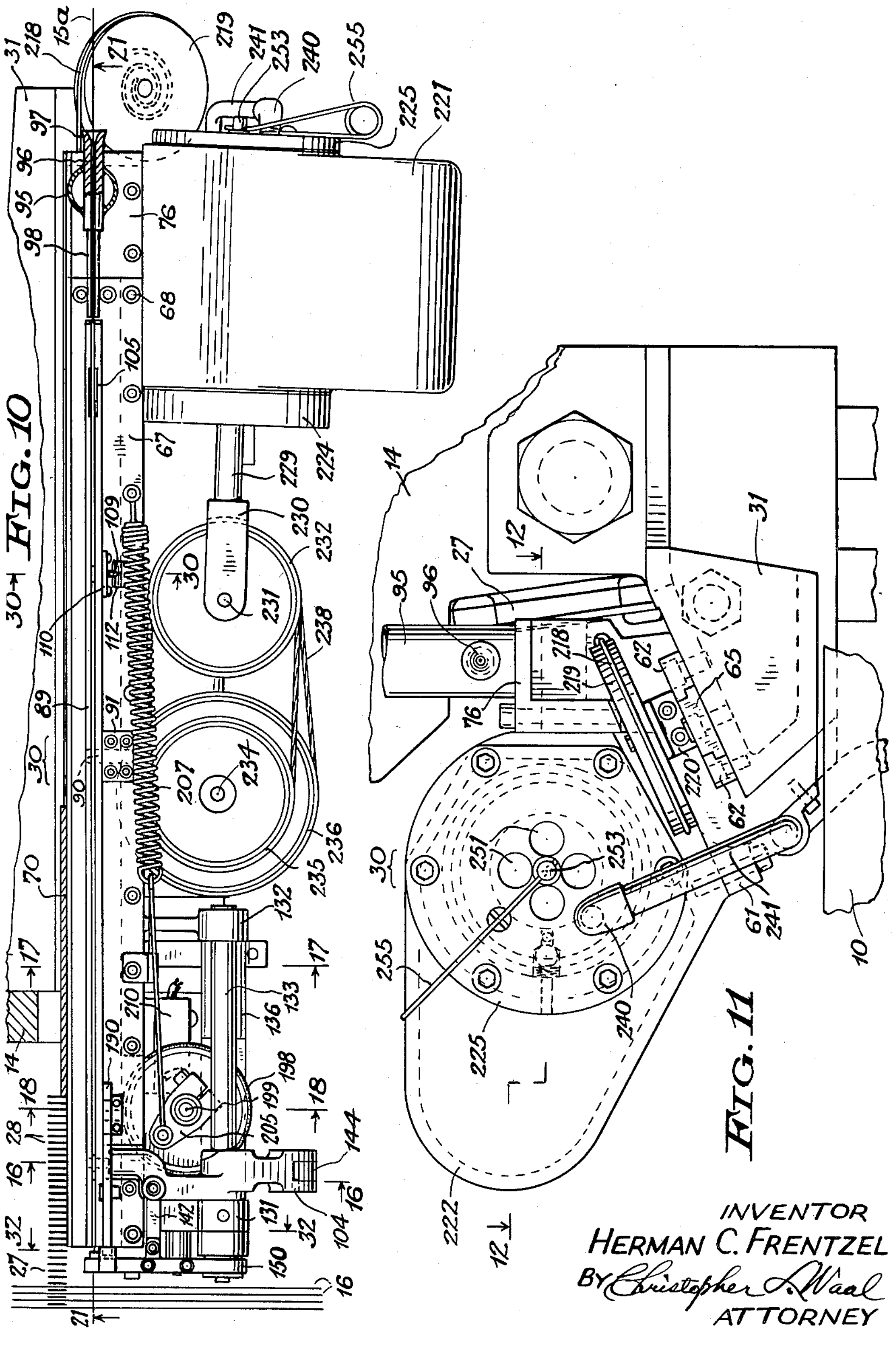
Fig. 10 is a top view of the right-hand shuttle box unit, parts being shown in section.
Fig. 11 is an outer end view of the right-hand lay-mounted shuttle box unit.
Figure 19:
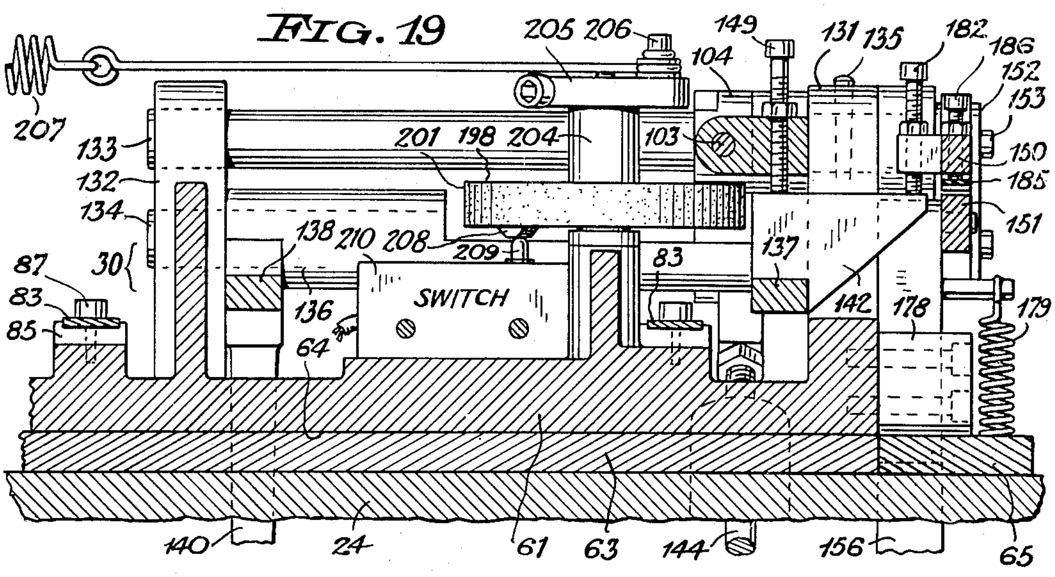
Fig. 19 is a sectional elevation taken generally on the line 19—19 of Fig. 15.

A light-weight wheel or roller 198, Figs. 10, 18, and 19, is rotatable on a shouldered vertical shaft 199 secured in the shuttle box body and extends through a lateral opening 200 in the shuttle-receiving portion of the body for rolling contact with the front side of the shuttle, the roller having a rim 201 of rubber or other suitable material to engage the shuttle. The lower portion of the shaft is rotatively adjustable in a bore 202 formed in the shuttle box body and is locked therein as by a setscrew 203. The upper portion of the shaft, which carries the roller, is slightly eccentric to the lower portion so that rotative adjustment of the shaft will provide the desired frictional contact between the roller and the shuttle. The roller extends between the shafts 133 and 134, the latter shaft and the brake-releasing member 136 thereon being cut away to clear the roller. The roller has an upwardly projecting hub 204, Fig. 18, to which is adjustably secured an arm 205 having an upstanding pin 206. A coiled spring 207, which extends longitudinally of the shuttle box, has one end secured to the pin 206 and has its other end secured to the shuttle box body, as seen in Fig. 10. At its underside the roller carries a cam member 208 which is engageable with the plunger 209 of a push-button switch 210 mounted on the shuttle box body, the switch being adapted to control the lay operation, as hereinafter set forth. The switch 210 is normally in one position, such as an open position, and is actuated by the roller cam 208 to the other position when the shuttle is properly boxed, as hereinafter described. The diameter of the wheel or roller 198 is so selected that the weft-carrying shuttle entering the shuttle box will turn the roller through an angle of about 210° before the shuttle is stopped by the shuttle brake. Of this displacement of the roller the first 180° is against the action of the spring 207 and provides a shuttle-braking action, and the next 30° of angular travel is assisted by the spring so that the roller then has a tendency to drive the shuttle farther into the shuttle box. A small additional spring-urged travel of the shuttle will thus occur upon release of the shuttle brake, so as to stretch off the laid weft wire which is still gripped by the shuttle and is clamped at the opposite shuttle box by the parts 108, 109, 112, Figs. 30 and 31. Upon subsequent release of the weft wire from the shuttle by the jaw-spreading cam blade 196, the spring-urged roller will drive the shuttle still farther in a homing travel against the adjacent end of the thrower block or ram 71 and hold the shuttle firmly against this block in preparation for the succeeding throwing operation, thus preventing impact between the thrower block and the shuttle.

Figures 12, 13, 14:
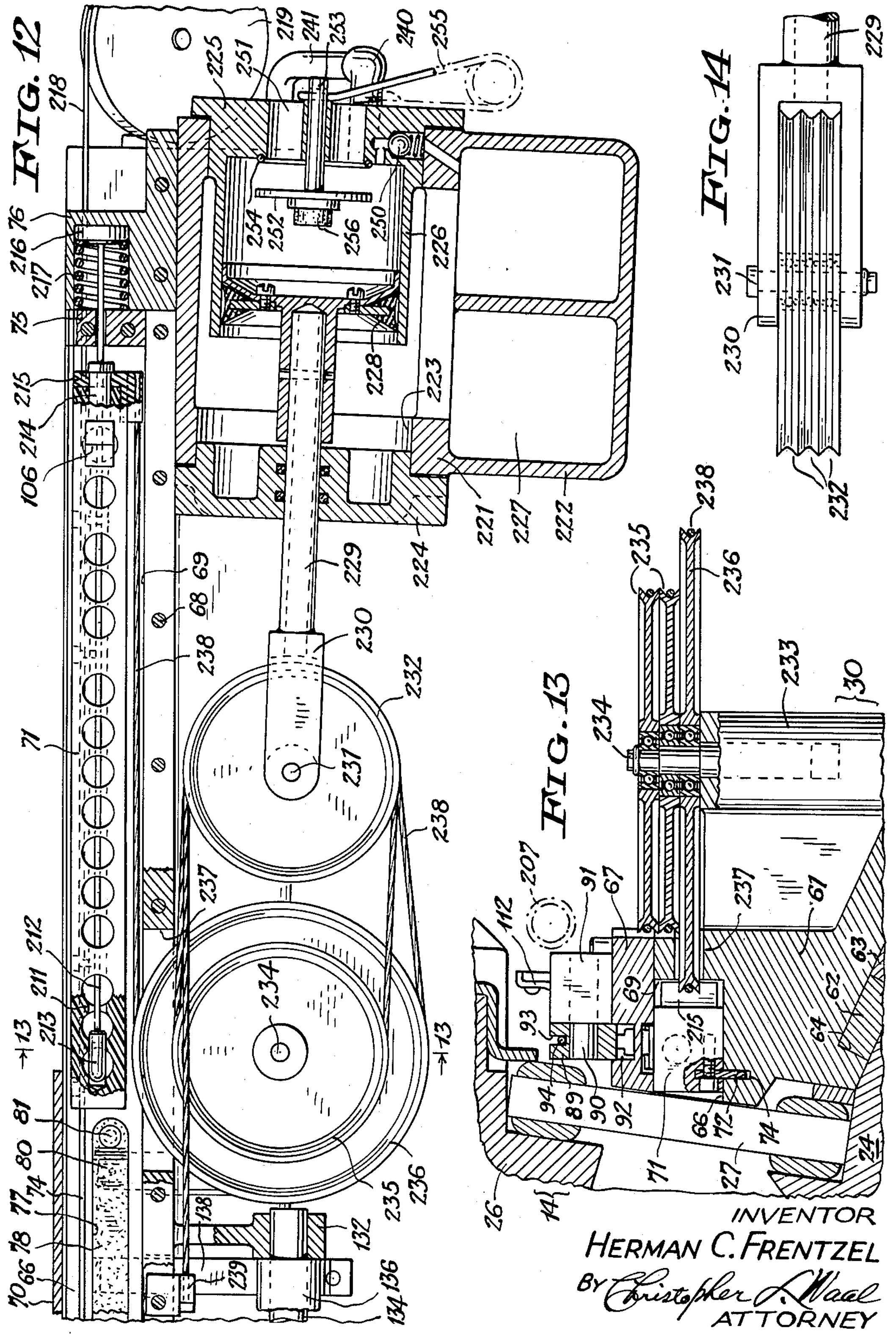
Fig. 12 is a horizontal section of a portion of the right-hand shuttle box unit, taken generally on the line 12—12 of Fig. 11.
Fig. 13 is a transverse sectional view taken generally on the line 13—13 of Fig. 12.
Fig. 14 is a side view of a multiple sheave for the shuttle-throwing mechanism.

The shuttle-throwing block 71 is formed of a suitable light-weight shock-resistant material such as a laminated plastic, for example, Formica, the block being transversely perforated to reduce weight. A longitudinal bore 211 is formed in the thrower block to receive a stop rod 212 having a front head 213. A headed hollow bolt 214, Figs. 12 and 25, which extends in the rear end of the thrower block, is threaded into the shoulder plug 106 and clamps an L-shaped metal cable-anchoring member 215. The stop rod 212 extends slidably through the bolt 214 and the shuttle box end block 75 and has a disk-like rear head 216 in the adjacent shuttle box block 76. A compressed coiled spring 217 is interposed between the block 76 and the rod head 216 and serves to cushion the thrower block at the end of its forward travel. The thrower block is spring retracted as by a flexible wire 218 secured to the block and passing around a spring-rotated retriever drum 219 which is mounted on a bracket 220, Fig. 11, secured to the rear end of the shuttle box body.

The thrower block 71 is urged on its shuttle-impelling stroke by pneumatic mechanism including a cylinder casing 221 which is rigidly secured to the shuttle box body and has a lateral chamber-forming extension 22. The cylinder casing has a bore 223 therethrough which is closed at opposite ends by heads 224 and 225, the latter having a coaxial cylinder sleeve 226 projecting into the bore, and there being an air chamber 227 in the casing communicating with the front end of the cylinder. A piston 228 is slidable in the cylinder and has a hollow piston rod 229 projecting through the cylinder head 224. The outer end of the piston rod is provided with a yoke 230 having a cross pin 231 which rotatably carries three grooved ball-bearing sheaves or pulleys 232. A vertical boss 233 on the shuttle box body carries an upstanding stud 234 on which are rotatably carried two grooved ball-bearing sheaves or pulleys 235 and a similar sheave or pulley 236 of larger diameter, the latter pulley being lowermost and extending into a slot 237 formed in the shuttle box body at the side of the rabbet 66. A flexible cable 238 is trained over the pulleys 232, 235, and 236 to form a motion-multiplying pulley block, one end of the cable being anchored on a clip 239 secured to the shuttle box, and the other end being secured to the rear end member 215 of the thrower block. The cable extends forwardly from the thrower end member 215 along a side of the thrower block and then passes around the large diameter pulley 236 and to and around the lowermost pulley 232 on the piston rod yoke. The cable then passes back and forth around the other pulleys and thence forwardly to the anchor clip 239. With this arrangement, the end of the cable attached to the thrower block will have a speed several times greater than the speed of the piston. The several pulleys are of light-weight construction and inertia effects are relatively low. The pulleys and the piston rod are preferably made of a light metal, such as an aluminum alloy.

Figures 6, 7, 8:
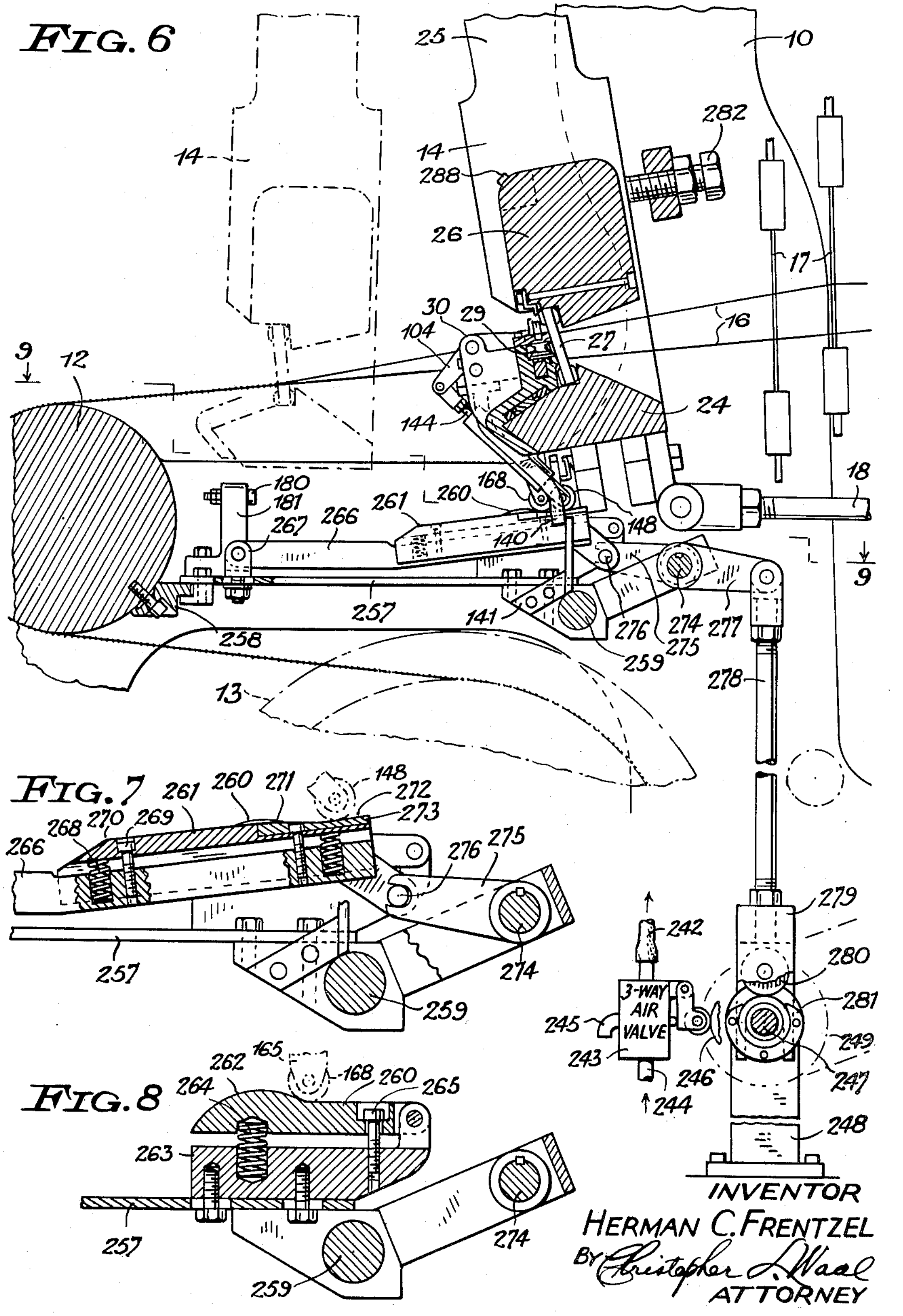
Fig. 6 is an elevational section taken generally on the line 6—6 of Fig. 3.
Fig. 7 is a side elevation of a cam assembly, parts of an oscillating cam member and actuating means therefor being shown in section.
Fig. 8 is a detail elevational section of a stationary cam member and its mounting.

The cylinder head 225 has an air inlet 240 periodically supplied with air under pressure through a pipe 241 which extends along the shuttle box and is connected by a flexible tube 242 to a stationary three-way air valve 243, Figs. 3 and 6, provided with a compressed air intake 244 and an exhaust 245. The air valves 243 for the respective shuttle boxes are mounted on the side frame members of the loom and are actuated by cams 46 on the opposite ends of a continuously rotating cam shaft 47 which extends across the loom and is journalled in bearing pedestals 428. The cam shaft is driven at a suitable speed from the loom drive as by means including a chain sprocket 249 on the shaft, the shaft being rotatable through one revolution for each complete loom cycle during which each of the weft wires 15*a* and 15*b* is laid in the shed from the opposite sides of the loom. The two sides of each air cylinder are in communication through a spring-loaded check valve 250, Fig. 12, which permits air to flow from the head 225 to the air chamber 27 but prevents flow in the opposite direction. The cylinder head 225 is provided with a plurality of exhaust ports or vents 251 which are normally open to atmosphere. The inner ends of the ports are closable by a disk valve 252 carried on a central valve stem 253 which is slidable in the head coaxially of the cylinder, the disk valve seating against a seat-forming rubber ring 254 carried by the head. A spring 255 normally urges the disk valve inwardly to its open position, and the valve carries a resilient buffer 256 engageable by the piston at the end of its throwing stroke to close the disk valve. The cylinder casing is charged with air when the disk valve is closed, compressed air then passing into the cylinder at one side of the piston and any needed leakage-replenishing air passing through the check valve 250 to the chamber 227 which communicates with the other side of the piston. During this operation, the air pressure holds the disk valve closed, and the difference in total pressure on opposite sides of the piston incident to the area of the piston rod moves the piston forwardly. Simultaneously the retriever drum 219 retracts the thrower block 71 and maintains tension on the cable 238, the thrower block being finally latched in its retracted position by the pawl 105 on the feeder arm. At this time the three-way valve 243 exhausts the pressure in the head end of the cylinder to a low value, whereupon the spring 255 urges the disk valve 252 inwardly to its open position. The piston is then under considerable pressure ready to effect throwing of the shuttle upon release of the pawl 105 from the thrower block. The air pressure on the piston tensions the relatively long flexible cable 238 and thus stores a considerable amount of energy in the cable. When the pawl is released the piston moves quickly on its shuttle-throwing stroke, the cylinder head ports 251 permitting rapid venting of the cylinder. As the volume of the air chamber or reservoir 227 is several times as large as the piston displacement, the air pressure in this chamber remains approximately constant during the travel of the piston so that the force on the piston is approximately constant during the throwing stroke of the piston.

A horizontal cam mounting frame 257 is placed at each side of the loom below the lay and is movably supported on a rail 258 secured along the breast beam 12 and on a horizontal rod 259 projecting inwardly from the adjacent side frame, so as to permit lateral adjustment of the frame. Each mounting frame carries thereon a stationary cam 260 and a laterally adjacent vertically swingable cam 261.

As seen in Fig. 8, the stationary cam 260, which has a rounded cam surface 262, is pivotally secured at its rear end to a bracket 263 adjustably secured to the frame, and is urged upwardly by a coiled spring 264 against an adjustable stop screw 265, so as to permit downward yielding of the cam. The cam roller 168 for the weft-clamping and cut-off mechanism rides on the stationary cam 260 when the lay is at the rear portion of its swinging travel. However, because of the spring-urged follower lever 165 on which the roller 168 is carried, the weft-clamping and cut-off mechanism is operated only during the forward swing of the lay. The spring mounting of the stationary cam 260 permits yielding of this cam under abnormal pressure.

The swingable cam 261, Fig. 7, is in the form of an elongated inverted channel which is saddled over the rear end portion of a swingable arm 266, the arm being pivotally mounted at its front end on a bracket 267 adjustably secured to the mounting frame. The cam 261 is urged upwardly by coiled springs 268 against adjustable stop screws 269 so as to permit downward yielding of the cam under excessive pressure. The front end portion of the cam 261 has a nose or hump 270, and the rear end has a drop-off point 271 and a depressed rearwardly rising cam surface 272 formed on a hardened block 273. The roller 148 for the weft feeding mechanism rides on the swingable cam 261 during certain parts of the cycle of operation, as hereinafter described. A rock shaft 274 is journalled in the rear portion of the mounting frame 257 and carries an arm 275 with a forked end engageable with a pin 276 on the swingable arm 266 to actuate the latter arm. A second arm 277 on the rock shaft 274 is connected by a depending rod 278 which has a yoke 279 at its lower end provided with a roller 280 riding on a cam 281 on the cam shaft 247, the yoke being slidably saddled over the cam shaft. The cams 281, which are near opposite ends of the cam shaft, are arranged to actuate in alternation the swingable cams 261 for the weft feeding mechanisms at the opposite shuttle boxes. Each cam mounting frame 257 carries near its front end the resilient latch releasing stop 180, 181, Figs. 6, 9, and 15, and carries near its rear end the resilient shuttle brake releasing stop 141, Figs. 3, 6, and 9. The rearward swing of the lay is adjustably limited by back stop screws 282 carried on the side frames of the loom.

The shuttle box switches 210 may be either normally open or normally closed, depending on the type of lay-controlling circuit to be used, and are here indicated to be normally open and to be closed by the arrival of the shuttle for permitting the subsequent fall of the lay. The lay-retracting air cylinder 20 has a valve 283 which in one position admits compressed air to the cylinder to retract the lay and in another position effects exhaust from the cylinder to permit the fall of the lay. The valve is operated to one of these positions, such as the latter position, by an electromagnet 284 connected to supply means 285, the supply circuit including contacts of a relay 286. The relay winding forms part of a circuit including a low voltage battery 287 or other source of current. The two shuttle box switches 210 are connected in parallel, and the parallel combination is connected in series in this circuit. The circuit also includes other series-connected switches, such as manually operable lay-carried switches 288 and 289 which are normally closed, another normally closed manually operated switch 290, and a cyclically operated timer switch 291 which automatically controls the loom operation. The shuttle box switches or circuit, closers 210 also have connected in parallel therewith a switch 292 which is mounted on the loom frame, Fig. 1, and is actuated to open position by a projection 293 on the lay as the lay approaches the back stop, this switch at other times being in closed position. When any of the series-connected switches are opened the lay will be retracted to its dwell. With the arrangement above described, a failure of electrical power will cause the lay to be retracted.

When it is desired to employ the type of lay-controlling circuit shown in the above Patent 1,790,335 to Weissenborn, the shuttle box switches are arranged to be normally closed and to be opened upon the arrival of the shuttle in the shuttle box.

In setting up the loom for use, the shuttle boxes are shifted along the lay beam and reed to suit the width of cloth to be woven, the inner ends of the shuttle boxes being close to the cloth edges, so as to minimize waste of weft wire. In this adjustment the weft-supply carriages 121 roll along the track bars 117. This adjustment also permits the use of reeds of various lengths, for example, reeds which have been shortened because of damaged end portions. The cam mounting frames 257 are shifted along their supporting members so as to register the cams 260 and 261 with the cooperating rollers 168 and 148. However, the latter adjustment is not critical as the cams are considerably wider than the rollers. As the shuttle-throwing mechanisms are carried by and shiftable with the shuttle boxes, these mechanisms require no separate adjustment. However, if adjustment of throwing force is desired, as for different cloth widths and different weft wire sizes, the air pressure may be changed.

Figure 51:
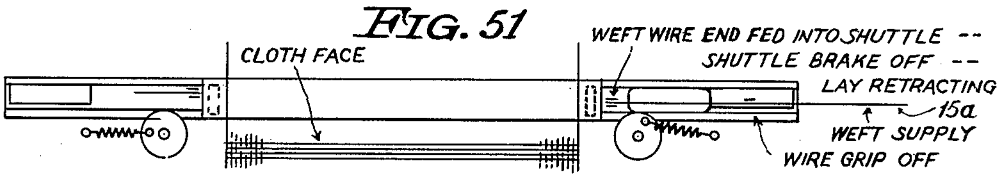
Figure 52:
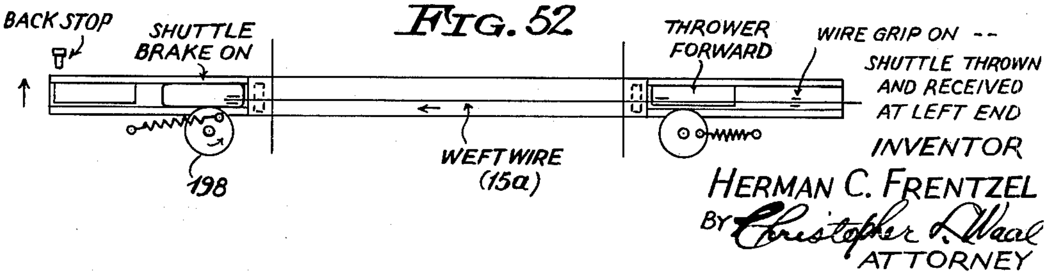

In the operation of the loom, starting with the shuttle 29 in the right-hand shuttle box, and the lay just starting to swing back, the sequence of events is as follows: As the roller 148 of the right-hand weft-feeding mechanism rides onto the associated cam 261, which has been elevated by the cam shaft 247, the lever 104 is rocked by the push rod 144, depressing the feeding end of the feeder arm 89 to insert the weft-feeding feather or vane 99 in the adjacent end portion of the corresponding shuttle channel or passageway 60, and at the same time depressing the brake shoe 78 by the engagement of the abutment screw 149 with the rib 142 on the brake-releasing arm 137. This passing position of the lay is represented schematically in Fig. 51. The angular displacement of the feeder arm also releases the cam pressure on the right-hand weft-clamping plunger 109, and when the feeding vane reaches its lowermost position the pawl 105 at the other end of the feeder arm is released upwardly from the shoulder plug 106 of the thrower block, causing the thrower block to throw the shuttle under the urge of the tensioned cable 238 and of the piston 228 in the air cylinder The energy stored in the tensioned low-inertia cable imparts a high velocity to the shuttle at the instant the latch or pawl is released. As the shuttle travels to the left from the right-hand shuttle box, the weft-clamping jaws at the trailing end of the shuttle grip the end of the weft wire 15*a* protruding from the feeding vane as the vane passes between these jaws, and the shuttle continues through the shed to the left-hand shuttle box, as indicated in Fig. 52, carrying the weft wire which is then under a slight friction at the spring-pressed plunger 109 of the right-hand shuttle box. Upon entering the left-hand shuttle box, the shuttle cocks the spring-tensioned roller 198. At the end of the shuttle-throwing stroke of the piston in the right-hand throwing cylinder, the piston closes the vent valve 252 against the action of its spring 255, and the three-way valve 243 then operates to admit compressed air to the cylinder for returning the piston, the vent valve remaining closed by the pressure of this air during the return stroke of the piston.

Under normal conditions the shuttle arrives at the left-hand shuttle box before the lay reaches the back stop. After the shuttle enters the left-hand shuttle box and as the lay approaches the back stop, the cam roller 148 at the right-hand shuttle box drops off the point 271 of the elevated cam 261 and onto the cam surface 272, thus rocking the right-hand feeder arm in the other direction to lift the feeding vane and to increase the clamping pressure on the weft wire at the plunger 109 before stretch-off occurs. As it approaches the back stop, the lay also opens the switch 292 which is connected in parallel with the shuttle box switches 210.

Just before the lay reaches the back stop, the arm 140 of each brake-releasing member 136 strikes the resilient stop 141, thus depressing the brake shoe in each shuttle box and releasing the shuttle which is then in the left-hand shuttle box. This permits the spring-tensioned roller 198 for the left-hand shuttle box to drive the shuttle farther into this shuttle box so as to stretch off the laid weft wire.

At this point, under normal conditions, the timer switch 291 is closed and the lay is ready to fall. However, to permit the fall or advance of the lay, the cam 208 on the spring-tensioned indicator-forming wheel or roller 198 must be in such position as to close the switch 210 in order that the lay cylinder valve 283 may be actuated to its exhaust portion. If the weft wire should be broken at the time of stretch-off, or if the weft wire should be absent, the shuttle will be carried by the roller 198 beyond the stretch-off position and against the left-hand thrower block. This additional shuttle travel is sufficient to cause the roller cam 208 to pass beyond the switch plunger 209 and thus cause this switch to open. Under this condition the lay will not fall, as the lay cylinder valve will not be actuated to exhaust position. Should the shuttle be improperly located at the time the lay is against the back stop, the roller cam will be out of switch-actuating position.

With all functions normal, the lay begins to fall, whereupon the arm 140 of the shuttle brake release member leaves the resilient stop 141, permitting both brake shoes 78 to be raised by their springs 83. At the same time the rollers 168 of both of the wire holding and cutting off mechanisms ride on and over the stationary cams 260, causing the levers 150 and 151 to close and hold the weft wire 15*a* and then cut off this weft wire at the right-hand shuttle box. As these holding levers close, they are retained in closed position by the spring-pressed latch bar 170, as seen in Fig. 15, illustrating a more forward position of the falling lay. The stretched and cut-off weft wire is thus held or clamped at both ends until the time of beat. The closing of the weft holding levers also depresses the brake-releasing arms 137 by the abutment screws 182 on these levers, and forces the cam blade or prong 196 downwardly between the weft-gripping bars of the shuttle to release the gripped end of the weft wire, thus permitting the shuttle to be carried to the left-hand thrower block by the spring-tensioned roller 198. This final travel of the shuttle opens the shuttle box switch 210, but the parallel-connected switch 292 has previously been closed by the initial forward travel of the lay so as to avoid premature retraction of the lay. As the advancing lay approaches the beat line, Fig. 49, the latch bars 170 for the wire holding mechanisms strike the resilient stops 180, causing the weft-holding levers to open approximately at the time of beat and simultaneously lifting the weft-releasing cam blade 196 from the shuttle.

Figure 45:
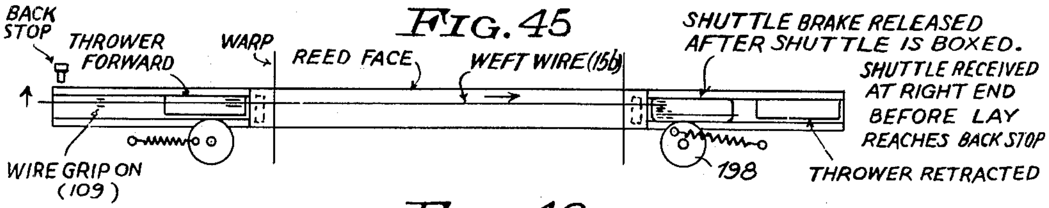
Figs. 45 to 52 are schematic top views showing successive positions of the lay and associated parts during the cycle of operation.
Figure 46:
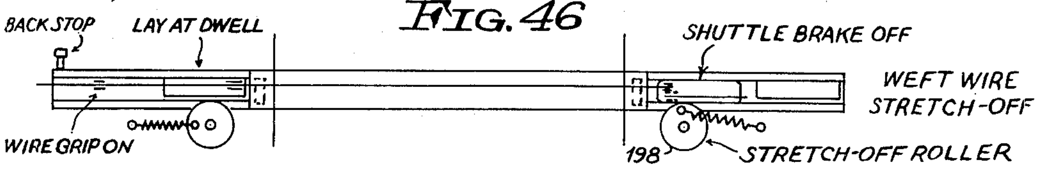
Figure 47:
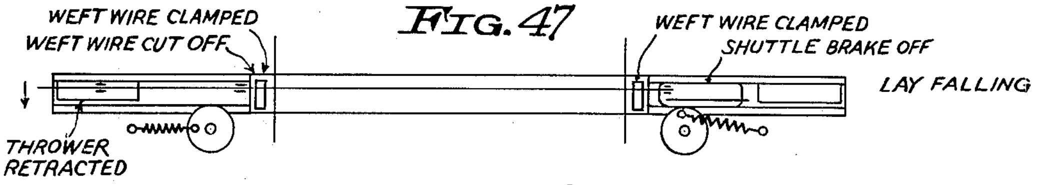
Figure 48:
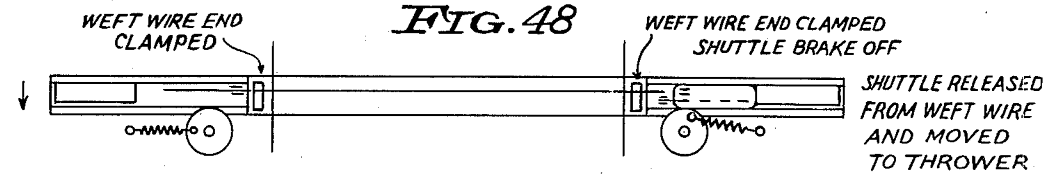
Figure 49:
Figure 50:
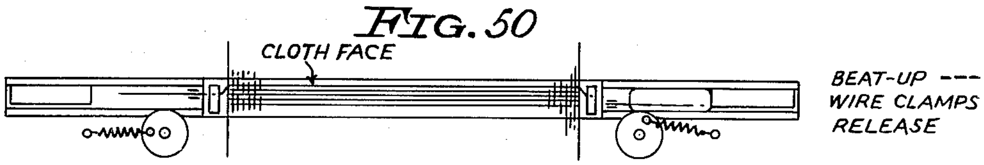

At this point the timer switch 291 opens and the lay swings back to start the second phase of the cycle, with the shuttle in the left-hand shuttle box, the left-hand swingable cam 261 being raised to operating position and the right-hand swingable cam being lowered. The sequence of operations is then repeated, with the operations applying to the reverse sides for manipulating the weft wire 15*b* supplied from the left-hand side of the loom. In Fig. 45, the shuttle has arrived at the right-hand shuttle box with the weft wire 15*b*, and the lay is at the back stop. In Fig. 46, the lay is still at the back stop, and stretch-off has occurred. In Fig. 47, the lay has started to fall, and the weft wire has been clamped and cut off. In Fig. 48, the lay is still falling and the shuttle has been released from the weft wire and has advanced to the thrower block. In Fig. 49, the lay is still falling and is approaching the beat line. In Fig. 50, the lay is shown at the time of beat-up. Figs. 51 and 52 show the lay on its retracting stroke and at the end of its retracting stroke, as hereinbefore described.

The charging of the air cylinders of the shuttle-throwing mechanisms may continue over the greater part of the cycle of operation, as the throwing operation is very brief.

While the invention has been embodied in a loom of the reciprocating shuttle type, some features of the invention are also applicable to the general type of loom in which a shuttle passes through the shed in one direction and returns in a path outside the shed.

What I claim as new and desire to secure by Letters Patent is:

1. In a loom, a weft-inserting gripper shuttle, a shuttle box adapted to receive the shuttle, a releasable shuttle-braking means, and impelling means for continuing the terminal travel of the shuttle after braking of the shuttle.

2. In a loom, a weft-inserting gripper shuttle, a shuttle box adapted to receive the shuttle, releasable shuttle-braking means, and a movably mounted shuttle-impelling member at said shuttle box frictionally and releasably coupled with said shuttle for continuing the terminal travel of said shuttle after braking of the shuttle.

3. In a loom having a lay, a weft-inserting gripper shuttle, a shuttle box adapted to receive the shuttle, releasable shuttle-braking means, a movably mounted shuttle-impelling member at said shuttle box releasably coupled with said shuttle for continuing the terminal travel of said shuttle after the braking operation, and means for controlling the advance of the lay including a control element actuated by said movably mounted member.

4. In a loom having opposed shuttle boxes and shuttle-throwing means including shuttle-projecting members, a reciprocatory weft-inserting shuttle adapted to engage a weft element, releasable shuttle-braking means at each shuttle box, releasable weft-clamping means at each shuttle box, weft-severing means at each shuttle box, and impelling means at each shuttle box for continuing the terminal movement of the shuttle after braking of the shuttle to effect stretch-off of the weft element and to bring and hold said shuttle against the associated shuttle-projecting member.

5. In a loom, the combination of a swingable lay having a reed adapted to guide a shuttle, and a shuttle box secured to said lay and longitudinally adjustable along said lay and reed, said shuttle box and reed forming opposite side walls of a shuttle-receiving space.

6. In a loom, the combination of a swingable lay having a reed, a shuttle box secured to said lay and longitudinally adjustable along said reed, and a shuttle-throwing power unit secured to said shuttle box and bodily shiftable therewith.

7. In a loom, a swingable lay, a shuttle box secured to said lay and adjustable along said lay, a weft-inserting shuttle, and throwing means for said shuttle including an air cylinder secured to said shuttle box and movable along the lay with said shuttle box.

8. In a loom, the combination of a swingable lay having a lay beam with a reed and a longitudinally extending guideway, said reed adapted to guide a shuttle therealong, a shuttle box carried by said lay beam and secured thereto in longitudinally adjusted position along said guideway, said shuttle box and reed forming opposite side walls of a shuttle-receiving space, and a power-operated shuttle-throwing unit carried by said shuttle box and shiftable therewith.

9. In a loom, the combination of a swingable lay with spaced shuttle boxes shiftable therealong, a reciprocatory weft-inserting shuttle movable between said shuttle boxes, throwing means for said shuttle, shuttle-braking means carried by each shuttle box, weft-severing means carried by each shuttle box and shiftable therewith, and means responsive to the swinging travel of the lay for controlling said throwing means and said weft-severing means.

10. In a loom, shuttle-throwing means including an air cylinder and a throwing member and further including a pulley block motion-multiplying connection between said air cylinder and said throwing member, said connection having a flexible cable tensioned by said air cylinder, and latch means for releasably holding said throwing member in retracted position against the tension of said cable.

11. In a loom, shuttle-throwing means including a power device and a throwing member and further including a rotary wheel motion-multiplying connection between said power device and said throwing member, said connection including a flexible cable tensioned by said power device, and latch means for releasably holding said throwing member in retracted position against the tension of said cable.

12. In a loom, the combination of a swingable lay, a reciprocatory weft-inserting shuttle adapted to grip a weft element, spaced shuttle boxes carried by said lay and adapted to alternately receive the shuttle, shuttle-throwing means associated with each shuttle box, weft-feeding means at each shuttle box, releasable shuttle-braking means at each shuttle box, first and second weft-clamping means at each shuttle box, weft-severing means at each shuttle box for severing the weft element at the shuttle box side of said second clamping means, impelling means at each shuttle box for continuing the terminal travel of the shuttle after braking of the shuttle, means for actuating the throwing means at the shuttle-holding shuttle box during the retracting travel of the lay, cam means for actuating the first weft-clamping means at the empty shuttle box, means operable while the lay is at the rear portion of its travel for releasing said clamping means to cause stretch-off of the weft element by said rotary impelling means, cam means operable during the fall of the lay for engaging said second weft-clamping means at each shuttle box and for operating the weft-severing means at said empty shuttle box and also for releasing said shuttle-braking means at each shuttle box, latch means for holding both said second weft-clamping means engaged, releasing means for said latch means operable at approximately the time of beat, and weft-releasing means operable on the boxed shuttle to release the weft end therefrom.

13. In a loom, shuttle-throwing means including a reciprocatory piston movable on throwing and return strokes, an air cylinder in which said piston is movable and having first and second air chambers at opposite sides of said piston, said first air chamber adapted to receive compressed air therein under approximately constant pressure for urging said piston on its throwing stroke, releasable retaining means for holding said piston at the end of its return stroke, said second air chamber having an air vent, a piston-controlled vent valve for closing said vent at the end of the throwing stroke, said vent valve being normally urged inwardly to open position in said second air chamber when the air pressure in said second air chamber is relatively low, means for admitting compressed air to said second air chamber when said vent valve is closed for holding said vent valve closed and for urging said piston on its return stroke against the air pressure in said first air chamber, and means for exhausting the compressed air from said second air chamber after said piston is retained at the end of its return stroke to permit opening of said vent valve.

14. In a loom, shuttle-throwing means including a reciprocatory piston movable on throwing and return strokes, an air cylinder in which said piston is movable and having first and second air chambers at opposite sides of said piston, said first air chamber adapted to receive compressed air therein under approximately constant pressure for urging said piston on its throwing stroke, releasable retaining means for holding said piston at the end of its return stroke, said second air chamber having an air vent, a piston-controlled vent valve for closing said vent at the end of the throwing stroke, said vent valve being normally urged inwardly to open position in said second air chamber when the air pressure in said second air chamber is relatively low, means for admitting compressed air to said second air chamber when said vent valve is closed for holding said vent valve closed and for urging said piston on its return stroke against the air pressure in said first air chamber, means including a check valve for admitting compressed air to said first air chamber from said second air chamber, and means for exhausting the compressed air from said second air chamber after said piston is retained at the end of its return stroke to permit opening of said valve vent.

15. In a loom, shuttle-throwing means including a reciprocatory piston movable on throwing and return strokes, an air cylinder in which said piston is movable and having first and second air chambers at opposite sides of said piston, said first air chamber adapted to receive compressed air therein under approximately constant pressure for urging said piston on its throwing stroke, releasable retaining means for holding said piston at the end of its return stroke, said second air chamber having an air vent, a piston-controlled vent valve for closing said vent at the end of the throwing stroke, said vent valve being normally urged inwardly to open position in said second air chamber when the pressure in said second air chamber is relatively low, means for admitting compressed air to said second air chamber when said vent valve is closed for holding said vent valve closed and for urging said piston on its return stroke, against the air pressure in said first chamber and means for exhausting the compressed air from said second air chamber after said piston is retained at the end of its return stroke to permit opening of said vent valve, the volume of said first air chamber when the piston is at the end of its return stroke being substantially greater than the displacement of said piston.

16. In a loom, shuttle-throwing means including a reciprocatory piston movable on throwing and return strokes, an air cylinder in which said piston is movable and having first and second air chambers at opposite sides of said piston, said piston having a greater effective area at said second chamber than at said first chamber, said first air chamber adapted to receive compressed air therein under approximately constant pressure for urging said piston on its throwing stroke, releasable retaining means for holding said piston at the end of its return stroke, means for admitting compressed air to said second air chamber for urging said piston on its return stroke against the air pressure in said first air chamber, and means for releasing the compressed air from said second air chamber while said piston is retained at the end of its return stroke.

17. In a loom, shuttle-throwing means comprising a throwing member, a reciprocatory member movable on throwing and return strokes, a motion-multiplying connection between said reciprocatory member and said throwing member including a tension-transmitting cable, releasable retaining means for holding said reciprocatory member at the end of its return stroke against the tension of said cable, power means for tensioning said cable and urging said reciprocatory member on its throwing stroke after release of said retaining means, and fluid pressure means for moving said reciprocatory member on its return stroke.

18. In a loom having a lay and a gripper shuttle impelling means for the shuttle, a shuttle box longitudinally shiftable along the lay, and weft-supplying means having an articulated connection with said shuttle box and shiftable with said shuttle box.

19. In a loom having a reciprocatory lay and a gripper shuttle, impelling means for the shuttle, a shuttle box on said lay having a weft guide extending longitudinally of said shuttle box, a weft spool spaced outwardly from said guide and having a generally horizontal axis in approximate alignment with said weft guide when the lay is at an intermediate point of its travel, and pivotal supporting means for said spool having a generally vertical pivotal axis.

20. In a loom having a gripper shuttle with weft-gripping jaws, a shuttle box from which the shuttle is adapted to be impelled, a feeder arm extending longitudinally of said shuttle box and pivotally mounted thereon to swing in a generally vertical plane, weft-guiding means on said feeder arm, and a weft-feeding member on said swingable arm receiving the weft therethrough and adapted to be projected into the path of the shuttle for opening said jaws during the initial part of the shuttle flight and for engaging an end portion of the weft in said jaws.

21. In a loom having a gripper shuttle with weft-gripping jaws, a shuttle box from which the shuttle is adapted to be impelled, a feeder arm extending longitudinally of said shuttle box and pivotally mounted thereon to swing in a generally longitudinal plane, weft-guiding means on said feeder arm, a weft-feeding member on said swingable arm receiving the weft therethrough and adapted to be projected into the path of the shuttle for opening said jaws during the initial part of the shuttle flight and for engaging an end portion of the weft in said shuttle jaws, a thrower for said shuttle, thrower-releasing means, and actuating means conjointly controlling said thrower-releasing means and said feeder arm.

22. In a loom having a gripper shuttle, a shuttle box from which the shuttle is adapted to be impelled, a feeder arm extending longitudinally of said shuttle box and pivotally mounted thereon to swing in a generally vertical plane, weft-guiding means on said feeder arm, a weft-feeding member on said swingable arm receiving the weft therethrough and adapted to be projected into the path of the shuttle for engaging an end portion of the weft in said shuttle, weft-holding means releasably engageable with the weft, and means controlled by said feeder arm for actuating said weft-holding means to holding position when the feeder arm is out of feeding position.

23. In a loom, a gripper shuttle having weft-gripping jaws, and a weft-feeding member having a movable weft-conducting and jaw-opening portion projectable into the path of the shuttle in a transverse direction with respect to the shuttle for opening said jaws during the initial part of the shuttle flight and for engaging a weft member in the jaws.

24. In a loom, a gripper shuttle having weft-gripping jaws at a trailing end thereof, a weft-feeding member having a movable weft-conducting and jaw-opening portion projectable into the path of the shuttle in a transverse direction with respect to the shuttle and in advance of said jaws for engaging a weft member in the jaws, and a weft-releasing member having a movable jaw-spreading portion projectable between said jaws in a transverse direction with respect to the shuttle for releasing a weft member from the jaws.

25. In a loom having a reciprocatory lay and opposed shuttle boxes thereon, a reciprocatory shuttle, shuttle control means associated with said shuttle boxes, actuating means for said control means including cam followers carried by said shuttle boxes and movably mounted cam members engageable by said followers during the travel of the lay, said cam members being movable into and out of the paths of the cooperating cam members, and means for moving said cam members in alternation.

26. In a loom, a lay having a shuttle box longitudinally shiftable therealong, a weft-inserting shuttle adapted to be impelled from said box, shuttle control means carried by said shuttle box and including a cam follower, a cam engageable by said follower during the travel of said lay, a carrier for said cam, and supporting means along which said carrier is shiftable in a direction parallel to the lay to place said cam in the path of said follower.

27. In a loom having a lay and a gripper shuttle, a shuttle box adapted to receive the shuttle, releasable shuttle braking means, impelling means for continuing the terminal travel of the shuttle after braking of the shuttle to a stop, a shuttle-actuated lay-controlling switch normally in inactive condition and movable to active condition upon the arrival of the shuttle at its braked stopping position, and to inactive condition upon the further travel of the shuttle to its terminal position.

28. In a loom, a weft-inserting shuttle, a shuttle box adapted to receive the shuttle therein, releasable shuttle-braking means, a rotatably mounted roller frictionally engageable with said shuttle during movement of the shuttle in said shuttle box, spring means connected to said roller for rotatably impelling said roller in either direction to a normal position, said roller being rotatable by the entering shuttle through an angle of more than 180° to bring the roller to a position in which the spring-impelled roller tends to urge the shuttle farther into the shuttle box.

29. In a loom, a reciprocatory lay movable on forward and retracting strokes, shuttle boxes on said lay, a reciprocatory gripper shuttle adapted to be thrown from and received in said shuttle boxes, throwing means for said shuttle, shuttle brakes at said respective shuttle boxes, weft-feeding means for engaging a weft in said shuttle during the retracting stroke of the lay, throwing means for throwing the weft-carrying shuttle during the retracting stroke of the lay, means for releasing the shuttle brake at the shuttle box from which the shuttle is thrown, means for releasing the shuttle brake at the receiving shuttle box at the end of the retracting stroke of the lay, impelling means for effecting a weft stretch-off movement of said shuttle while said lay is retracted, clamping and severing means for the laid weft, actuating means for said last-named means operable during the forward travel of the lay, means operable during the forward travel of the lay to release the end of the laid weft from the shuttle, and means operable approximately at the time of beat to release said weft clamping and severing means.

30. In a loom, shuttle throwing means including a reciprocatory piston movable on throwing and return strokes, an air cylinder in which said piston is movable and having first and second air chambers at opposite sides of said piston, the effective area of said piston at said second chamber being greater than the effective area of said piston at said first chamber, said first air chamber adapted to confine therein a body of compressed air under approximately constant pressure for urging said piston on its throwing stroke, means for admitting compressed air to said second air chamber after a single shuttle throw for moving said piston on its return stroke against the pressure in said first air chamber, releasable retaining means for holding said piston at the end of its return stroke against the air pressure in said first air chamber, and valve means for exhausting said second air chamber after said piston is retained at the end of its return stroke.

References Cited in the file of this patent

UNITED STATES PATENTS

| | | |
|---|---|---|
| 948,945 | Smith | Feb. 8, 1910 |
| 1,527,779 | Boitel | Feb. 24, 1925 |
| 1,564,603 | Martin | Dec. 8, 1925 |
| 2,027,806 | Bird | Jan. 14, 1936 |
| 2,030,270 | Rossmann | Feb. 11, 1936 |
| 2,052,655 | Pool | Sept. 1, 1936 |
| 2,090,703 | Rossmann | Aug. 24, 1937 |
| 2,528,150 | Kronoff | Oct. 31, 1950 |
| 2,537,895 | Hicks | Jan. 9, 1951 |

FOREIGN PATENTS

| | | |
|---|---|---|
| 195,624 | Switzerland | June 1, 1938 |
| 600,615 | Germany | July 27, 1934 |
| 623,735 | Great Britain | May 23, 1949 |